United States Patent
Gerber et al.

(10) Patent No.: US 10,133,620 B2
(45) Date of Patent: Nov. 20, 2018

(54) DETECTING ERRORS IN REGISTER RENAMING BY COMPARING VALUE REPRESENTING COMPLETE ERROR FREE SET OF IDENTIFIERS AND VALUE REPRESENTING IDENTIFIERS IN REGISTER RENAME UNIT

(71) Applicant: Intel Corporation, Santa Clara, CA (US)

(72) Inventors: Alex Gerber, Haifa (IL); Yiannakis Sazeides, Nicosia (CY); Arkady Bramnik, Kiryat Motzkin (IL); Ron Gabor, Hertzliya (IL)

(73) Assignee: Intel Corporation, Santa Clara, CA (US)

(*) Notice: Subject to any disclaimer, the term of this patent is extended or adjusted under 35 U.S.C. 154(b) by 93 days.

(21) Appl. No.: 15/402,835

(22) Filed: Jan. 10, 2017

(65) Prior Publication Data
US 2018/0196706 A1   Jul. 12, 2018

(51) Int. Cl.
*G06F 11/00* (2006.01)
*G06F 11/07* (2006.01)

(52) U.S. Cl.
CPC ........ *G06F 11/079* (2013.01); *G06F 11/0721* (2013.01); *G06F 11/0727* (2013.01); *G06F 11/0751* (2013.01)

(58) Field of Classification Search
CPC .............. G06F 11/079; G06F 11/0721; G06F 11/0727; G06F 11/0751; G06F 12/10; G06F 2212/65
See application file for complete search history.

(56) References Cited

U.S. PATENT DOCUMENTS

| | | |
|---|---|---|
| 5,805,916 A | 9/1998 | Mallick et al. |
| 5,974,524 A | 10/1999 | Cheong et al. |
| 6,256,721 B1 | 7/2001 | Witt |
| 6,279,102 B1 | 8/2001 | Morrison |
| 6,308,260 B1 | 10/2001 | Le et al. |
| 2006/0090061 A1 | 4/2006 | Akkary et al. |
| 2007/0050602 A1 | 3/2007 | Lien et al. |

(Continued)

OTHER PUBLICATIONS

Non-Final Office Action from U.S. Appl. No. 15/402,825, dated Jul. 26, 2018, 17 pages.

*Primary Examiner* — Bryce P Bonzo
*Assistant Examiner* — Katherine Lin
(74) *Attorney, Agent, or Firm* — NDWE, LLP

(57) ABSTRACT

A processor includes physical storage locations, and a register rename unit that includes a plurality of register rename storage structures. At a given time, each of a complete group of physical storage location identifiers is to be stored in one, but only one, of the plurality of register rename storage structures, unless there is an error. Each of the complete group of physical storage location identifiers is to identify a different one of the physical storage locations. The register rename unit is to detect an error when a first value, which is to be equal to an operation on the complete group of the physical storage location identifiers with no errors, is inconsistent with a second value. The second value is to represent the operation on all physical storage location identifiers that are to be stored in the plurality of register rename storage structures at the given time.

25 Claims, 16 Drawing Sheets

(56) References Cited

U.S. PATENT DOCUMENTS

2013/0151819 A1* 6/2013 Piry .................... G06F 9/38
  712/217
2016/0103736 A1 4/2016 Bose et al.

* cited by examiner

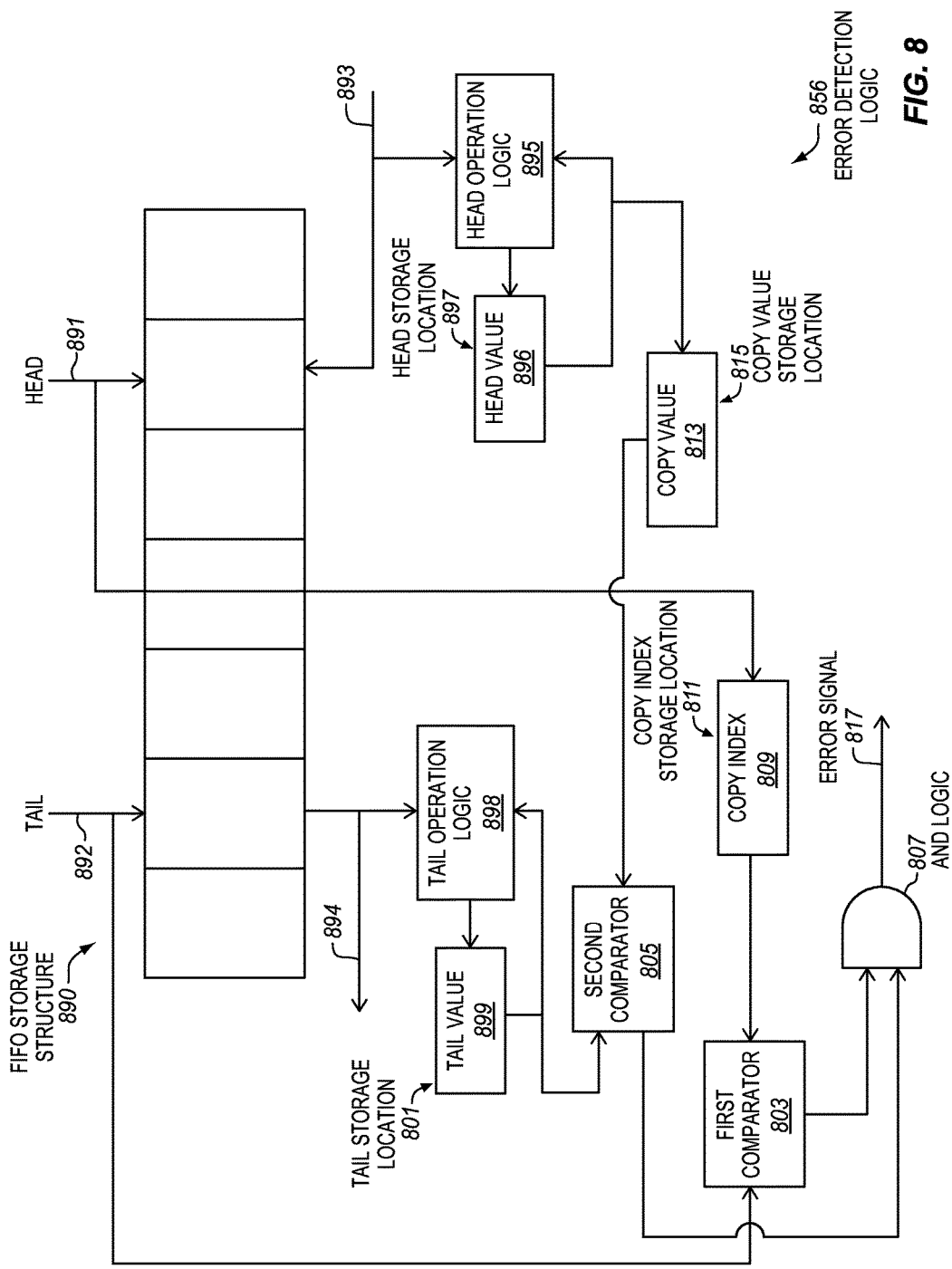

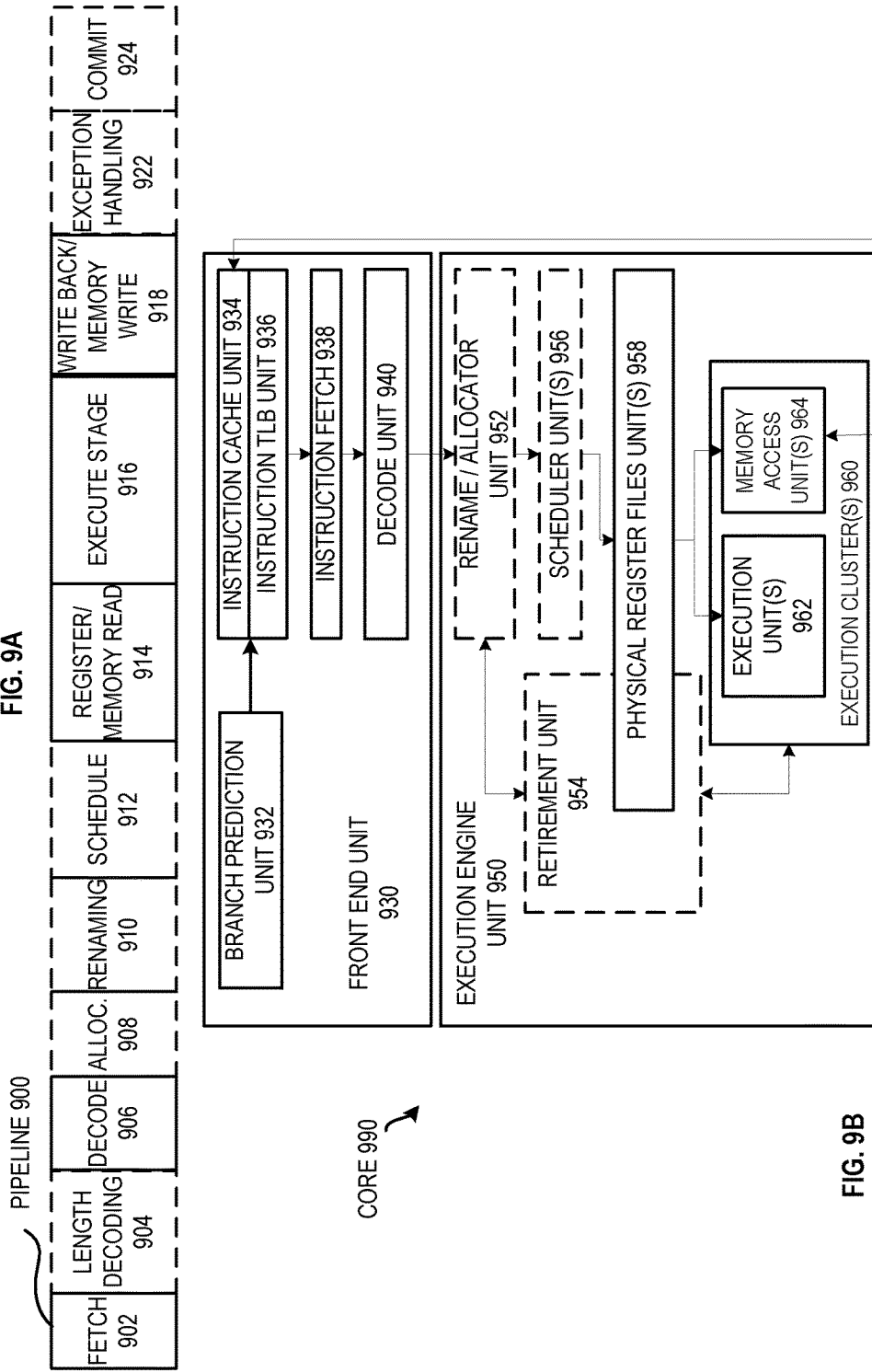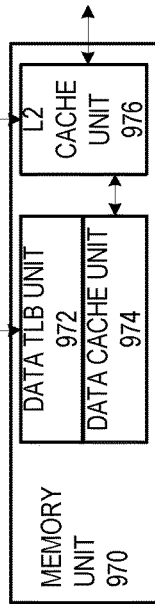
FIG. 9A
FIG. 9B

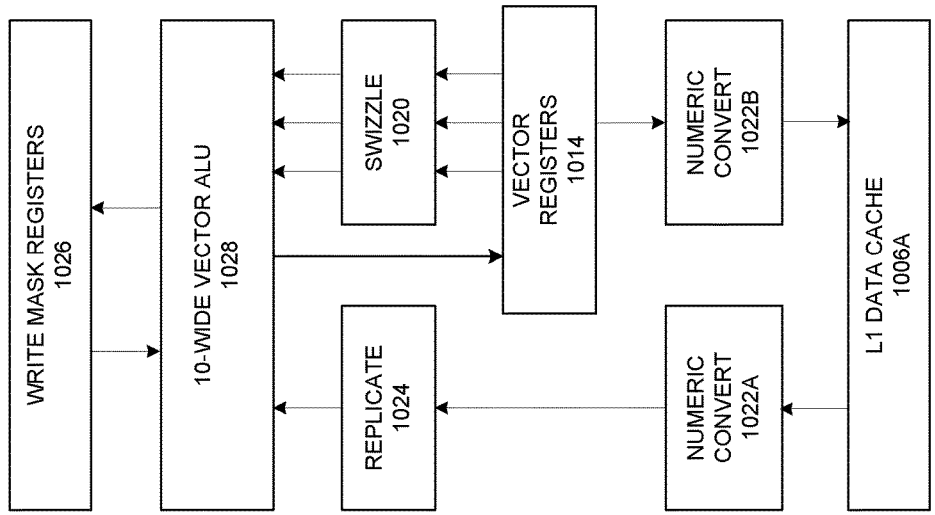
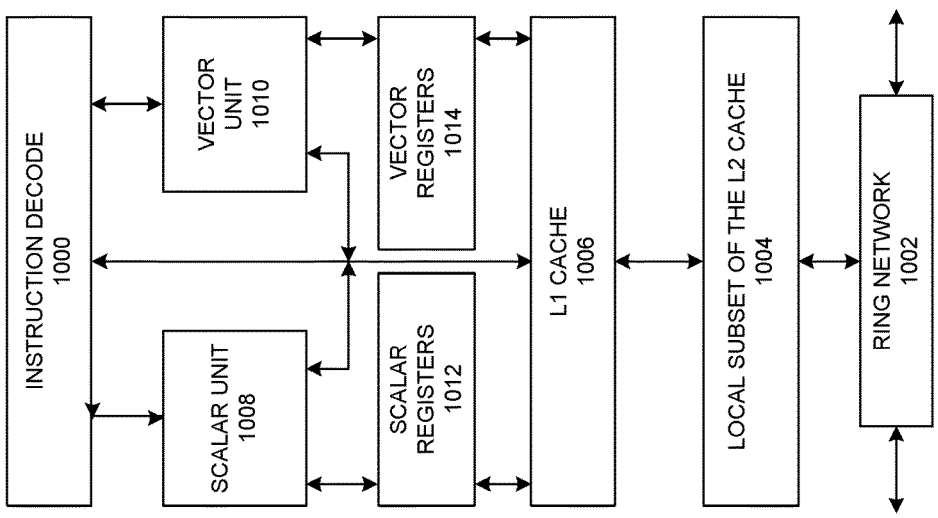

DETECTING ERRORS IN REGISTER RENAMING BY COMPARING VALUE REPRESENTING COMPLETE ERROR FREE SET OF IDENTIFIERS AND VALUE REPRESENTING IDENTIFIERS IN REGISTER RENAME UNIT

BACKGROUND

Technical Field

Embodiments described herein relate to processors. More specifically embodiments described herein generally relate to register renaming in processors.

Background Information

Processors are generally designed to have and/or support an instruction set architecture (ISA). The ISA represents the part of the architecture of the processor related to programming. The ISA may define or specify the native instructions, architectural registers, data types, and certain other architectural aspects of the processor.

The architectural registers may represent those registers that are exposed or visible to software and/or a programmer. For example, the architectural registers may represent those registers that instructions of an instruction set of the processor indicate to identify their source and/or destination operands.

Commonly, there may be a relatively small number of architectural registers of a given type and/or at least less registers of the given type than may be desirable. One possible reason for this is to help promote a compact instruction encoding. If more architectural registers were supported, then each of the architectural register indices or identifiers (often included in the instruction encoding) may need to have more bits, which may tend to increase the instruction length.

BRIEF DESCRIPTION OF THE DRAWINGS

The invention may best be understood by referring to the following description and accompanying drawings that are used to illustrate embodiments. In the drawings:

FIG. 8 is a block diagram of an embodiment of a FIFO storage structure and a second example embodiment of error detection logic to detect errors for the FIFO storage structure.

FIG. 9A is a block diagram illustrating an embodiment of an in-order pipeline and an embodiment of a register renaming out-of-order issue/execution pipeline.

FIG. 9B is a block diagram of an embodiment of processor core including a front end unit coupled to an execution engine unit and both coupled to a memory unit.

FIG. 10A is a block diagram of an embodiment of a single processor core, along with its connection to the on-die interconnect network, and with its local subset of the Level 2 (L2) cache.

FIG. 10B is a block diagram of an embodiment of an expanded view of part of the processor core of FIG. 10A.

DETAILED DESCRIPTION OF EMBODIMENTS

In the following description, numerous specific details are set forth (e.g., specific implementations of register renaming, specific register rename storage structures, specific microarchitectural details, specific sequences of operations, etc.). However, embodiments may be practiced without these specific details. In other instances, well-known circuits, structures and techniques have not been shown in detail to avoid obscuring the understanding of the description.

Figure 1:
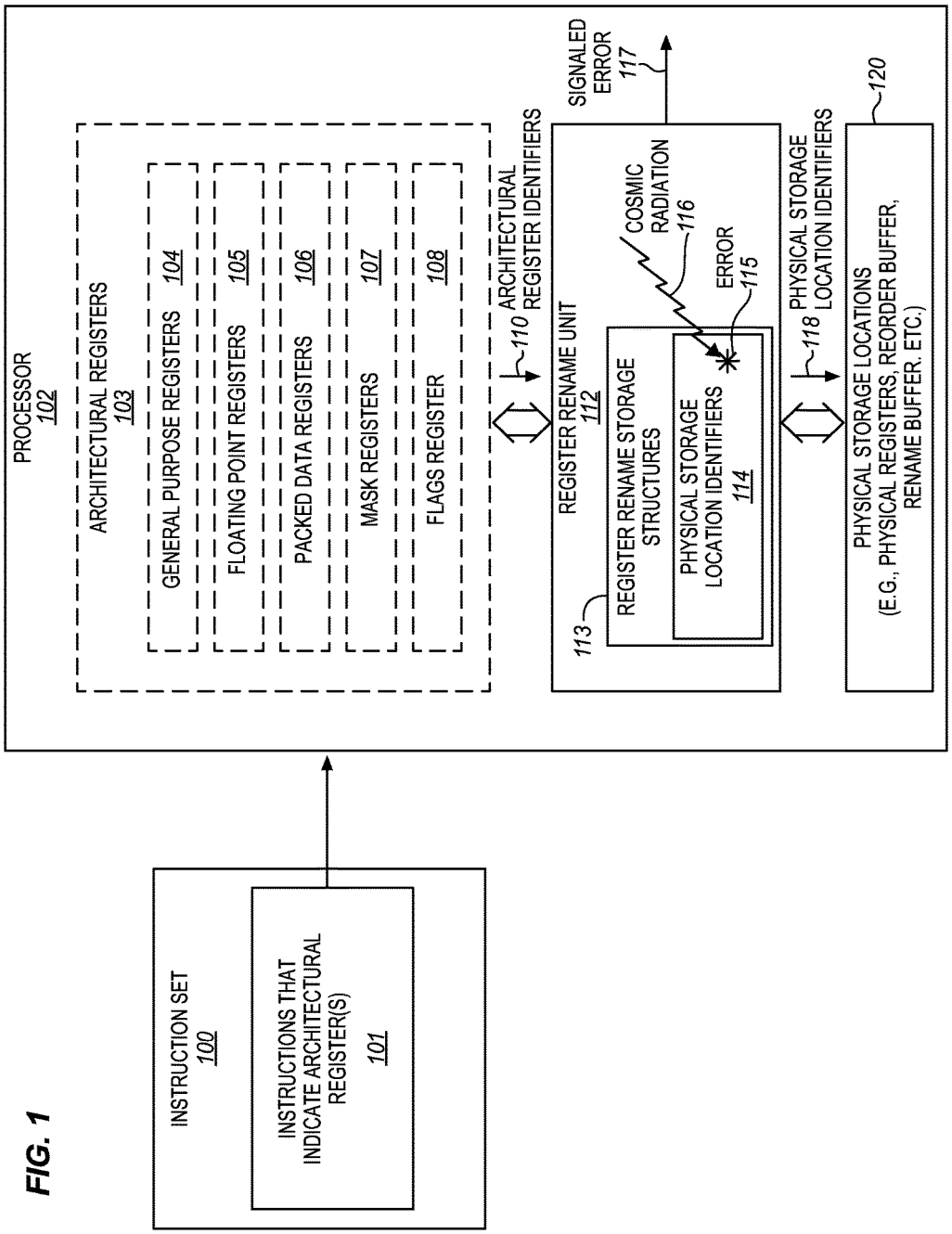
FIG. 1 is a block diagram of an embodiment of a processor that includes a register rename unit that is suitable for implementing embodiments.

FIG. 1 is a block diagram of an embodiment of a processor 102 that includes a register rename unit 112 that is suitable for implementing embodiments. In some embodiments, the processor may be a general-purpose processor (e.g., a central processing unit (CPU) or other general-purpose microprocessor of the type used in desktop, laptop, or other computers). Alternatively, the processor may be a special-purpose processor. Examples of suitable special-purpose processors include, but are not limited to, network processors, communications processors, cryptographic processors, graphics processors, co-processors, embedded processors, digital signal processors (DSPs), and controllers (e.g., microcontrollers). The processor may have any of various complex instruction set computing (CISC) architectures, reduced instruction set computing (RISC) architectures, very long instruction word (VLIW) architectures, hybrid architectures, other types of architectures, or have a combination of different architectures (e.g., different cores may have different architectures).

The processor may have and/or support an instruction set 100. The instruction set may include the set of instructions that the processor is natively able to perform (e.g., decode and execute). The instructions of the instruction set may represent macroinstructions, assembly language instructions, machine language instructions, or other relatively higher level instructions that are provided to the processor for execution, as opposed to microinstructions, micro-ops, or other decoded instructions or control signals that are decoded from the instructions of the instruction set.

The ISA may also define or specify one or more sets of architectural registers 103. As shown, at least some instructions 101 of the instruction set (e.g., various types of data processing instructions) may each explicitly specify or otherwise indicate one or more source and/or destination architectural registers of the one or more sets of architectural registers 103.

In some cases, an instruction may explicitly specify an architectural register. For example, the instruction may have a field or set of bits in its instruction encoding to provide an architectural register index or other architectural register identifier (e.g., a string of bits sufficient to uniquely identify one of the architectural registers). In other cases, an instruction may inherently, impliedly, or otherwise implicitly indicate a given/fixed architectural register. For example, it may be implicit (e.g., to the instructions opcode) to use the given/fixed architectural register, even though the instruction may not have any non-opcode bits to explicitly specify the given/fixed architectural registers index or identifier. As one specific illustrative example, a scalar multiply instruction may have a first field to explicitly specify a first architectural register identifier to identify a first source architectural register that is to be used to store a multiplicand, may have a second field to explicitly specify a second architectural register identifier to identify a second source architectural register that is to be used to store a multiplier, and may implicitly indicate that the first source architectural register is also to be reused as a destination architectural register where a product is to be stored.

Various types of architectural registers may optionally be defined or specified in various embodiments. Examples of suitable types of architectural registers include, but are not limited to, general purpose registers 104, floating point registers 105, packed data registers 106, mask registers 107, a flag register 108, and various combinations thereof. The packed data registers may also sometimes be referred to as vector registers or single instruction, multiple data (SIMD) registers. The mask registers may also sometimes be referred to as predicate registers. The flags register may also be referred to as status register or condition code register. In various embodiments, any one or more, or any combination, of these architectural registers, as well as other types of architectural registers, may optionally be renamed through register renaming using the approaches disclosed herein.

One reason for register renaming is that commonly there may tend to be a relatively small number of architectural registers of each different type and/or less than desired. This may tend to cause more frequent register reuse (e.g., since there is only a relatively small number of architectural registers in which to store the operands of the instructions being performed). By way of example, consider the following pseudocode:

Line 1: $R1 \leftarrow M[2056]$ (load value at memory 2056 into register R1)

Line 2: $R1 \leftarrow R1+6$ (add 6 to value in R1 and store result in R1)

Line 3: $M[2048] \leftarrow R1$ (store value in register R1 to memory 2048)

Line 4: $R1 \leftarrow M[1032]$ (load second value at memory 1032 into R1)

Line 5: $R1 \leftarrow R1-3$ (subtract 3 from value in R1 and store result in R1)

Line 6: $M[1024] \leftarrow R1$ (store value in R1 to memory 1024)

Notice that the same architectural register R1 is reused by both the instructions/operations of lines 1-3 as well as the instructions/operations of lines 4-6. The instructions/operations of lines 4-6 do not have any true data dependencies on those of lines 1-3. However, the instruction/operation of line 4 cannot be performed until that of line 3 has finished. Otherwise, an error could result (e.g., the value from M[1032] loaded into R1 in line 4 could be stored to M[2048] at line 3 instead of the value of R1 calculated in line 2). This is an example of a write-after-read (WAR) data hazard in which a read from a register (e.g., at line 3) should generally return the latest value written to that register (e.g., at line 2) instead of a value written to that register (e.g., at line 4) after the read (e.g., at line 3) in original program order. Specifically, the reuse of the register R1 by both the instructions/operations of lines 1-3 and lines 4-6 has created what is referred to as a "false" data dependency. The data dependency is said to be "false" because the data dependency does not originate from the instructions/operations themselves (e.g., the earlier instructions/operations of lines 1-3 in program order do not produce data that is to be used by those of lines 4-6 subsequent in the program order). Rather, the data dependency is due to the reuse of the architectural register R1. Such false data dependencies are also sometimes referred to as "name" dependencies. Another type of false dependency is a write after write (WAW) or anti-dependency. An example would be the instruction of line 5 executing before the instruction of line 2, and then subsequently the instruction of line 2 overwriting the result stored by the instruction of line 5. This can lead to the instruction of line 6 using the wrong source data.

Referring again to FIG. 1, the processor includes a register rename unit 112 and a set of physical storage locations 120. The register rename unit may be operative to perform register renaming to rename individual ones of the architectural registers 103 to individual ones of the physical storage locations 120. For example, the register rename unit may receive at least some of the architectural register identifiers 110 that are indicated by the instructions 101 being performed, and may be operative to map, replace, or otherwise rename these architectural register identifiers to corresponding physical storage location identifiers 118 that each identify ones of the physical storage locations 120. In some embodiments, the register rename unit may include two or more register rename storage structures 113 (e.g., array storage structures, table storage structures, first in, first out (FIFO) storage structures, circular buffer storage structures, a free list storage structure, a register map storage structure, a reclamation table storage structure, a register history table storage structure, a reorder buffer, a checkpoint table storage structure, etc.) to store physical storage location identifiers 114. In various embodiments, any one or more, or any combination, of the previously described types of architectural registers 104, 105, 106, 107, 108, as well as other types, may optionally be renamed by the register rename unit.

The register renaming may help to eliminate at least some of the "false" or "name" data dependencies. To further illustrate, consider an application of register renaming to the pseudocode described above. With register renaming, the architectural register R1 used in lines 1-3 may be renamed to a first physical storage location P1, and the architectural register R1 used in lines 4-6 may be renamed to a second different physical storage location P2 as follows:

Line 1: P1←M[2056]
Line 2: P1←P1+6
Line 3: M[2048]←P1
Line 4: P2←M[1032] (P2 used instead of P1)
Line 5: P2←P2−3
Line 6: M[1024]←P2

In practice, such register renaming may include replacing the architectural register index or identifier for R1 (e.g., one string of bits) with physical storage location identifiers for P1 and P2 (e.g., two different strings of bits). Since typically more physical storage locations are employed than the number of architectural registers (e.g., to reduce physical storage location reuse), each of the physical storage location identifiers generally has more bits than the architectural register identifier. By way of example, the architectural register identifiers may commonly have from 3-bits to 6-bits, whereas the physical storage location identifiers may commonly have from 6-bits to 10-bits, although the scope of the invention isn't limited to any such numbers of bits.

Such register renaming may be useful to help reduce false data dependencies created by write-after-read (WAR) data hazard scenarios (e.g., in which a read from a register should generally return the latest prior value written to that register instead of a value written to that register after the read in original program order). Such register renaming may also be useful to reduce anti-dependencies due to write-after-write (WAW) data hazard scenarios (e.g., when a later instruction writes to a register before an earlier instruction). This may help to allow more instruction-level parallelism, which may be exploited by various and complementary techniques such as, for example, superscalar execution, out-of-order execution, and the like, to help improve performance. For example, notice that the register renaming has eliminated the false data dependencies between lines 1-3 and 4-6. The instructions/operations of lines 4-6 may now be performed concurrently with and/or out-of-order with respect to the instructions/operations of lines 1-3, without causing erroneous results. Instead of having to delay the write at line 4 until the prior read at line 3 has been completed, two different physical storage locations (P1 and P2) have been used, with one (P1) storing the original value before the write and another (P2) storing the new value after the write. Then, the physical storage locations mapped to the logical registers may be reclaimed for further register renaming when the next instruction in original program order that writes to the same logical register commits.

The physical storage locations 120 may be of various types in different embodiments. In some embodiments, the physical storage locations 120 may optionally include a merged rename and architectural register file. The merged rename and architectural register file may include a single set of physical registers, generally larger in number than the number of architectural registers being renamed, and the role of the physical registers may be changed from renamed registers to architectural registers as instructions are retired or otherwise committed. In other embodiments, the physical storage locations 120 may optionally include both entries in a reorder buffer (ROB) as well as a set of architectural (also referred to as retirement) registers. Entries in the ROB may be used to store operands until instructions are committed, and then the operands may be transferred to and stored in the architectural registers. These are just a few illustrative examples. Other types of physical storage locations, and combinations of different types, may optionally be used (e.g., one of the above described approaches may be used for one set of architectural registers whereas a different approach may be used for another set of architectural registers). In the illustration, the architectural registers 103 are shown in dashed lines to indicate that, in some register rename approaches they may actually exist as a set of actual physical registers, whereas in other register rename approaches they may not actually exist as a set of actual physical registers, but rather may represent logical registers that are aliased or mapped at appropriate times to physical storage locations.

One significant challenge is that the register rename unit 112 may tend to be susceptible to certain types of errors, such as, for example, soft errors, hard errors, logic errors, and combinations thereof. The soft errors may include transient bit flips that may be caused by cosmic radiation, manufacturing defects, latent faults, timing imperfections, device aging, and the like, and combinations thereof. The hard errors may include stuck bits that are stuck at a particular binary value (e.g., bits stuck at binary 0 or binary 1). Such hard errors may be caused in part by manufacturing defects, latent faults, aging, and combinations thereof. Logic errors may represent late post-silicon bugs or errors that may potentially be caused by soft or hard errors. In some cases, such errors may flip one or more bits or change a value of a physical storage location identifier used for register renaming. By way of example, cosmic radiation 116 may impact one of the physical storage location identifiers 114, for example when it is stored in the register rename storage structures or being transmitted between the storage structures, and may cause one or more transient bit flips that represent an error 115. In other cases, the physical storage location identifiers may be changed by other soft errors, hard errors, logical errors, or various combinations thereof (e.g., there could be soft, hard, or logic errors in logic or structures used to convey or process the physical storage location identifiers). In some embodiments, the register rename unit 112 may include and/or use the embodiments disclosed elsewhere herein (e.g., in conjunction with FIGS. 3-6) to help support error detection.

Figure 2:
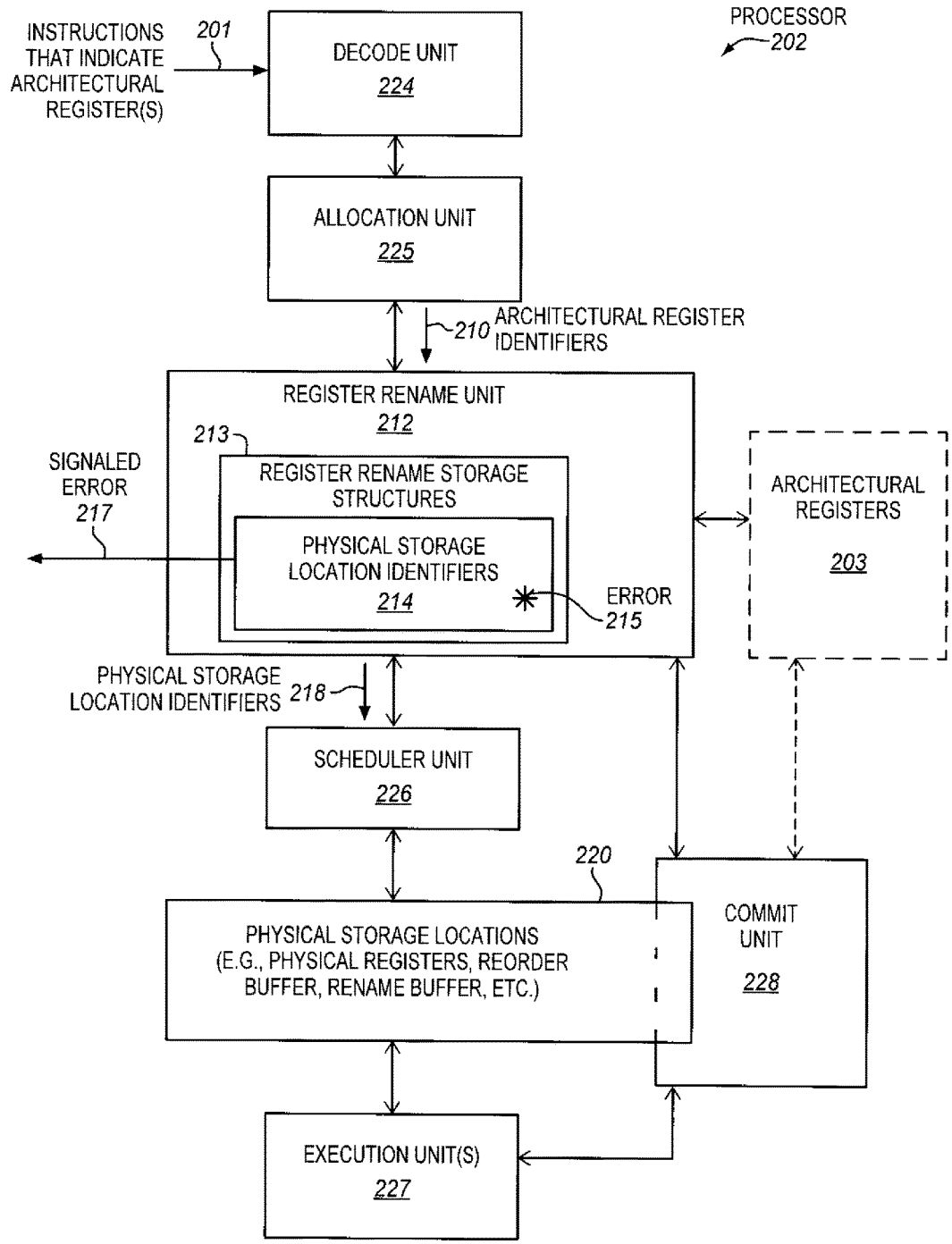
FIG. 2 is a block diagram of a detailed example embodiment of an out-of-order execution processor that includes a register rename unit that is suitable for implementing embodiments.

FIG. 2 is a block diagram of a detailed example embodiment of an out-of-order execution processor 202 that includes a register rename unit 212 that is suitable for implementing embodiments. The processor 202 includes a register rename unit 212, one or more sets of architectural registers 202, and physical storage locations 220, which may optionally be similar to, or the same as, the correspondingly named components of FIG. 1. To avoid obscuring the description, the new and different characteristics of FIG. 2 will primarily be described.

During operation, the processor may receive at least some instructions 201 of an instruction set that may each explicitly specify or otherwise indicate one or more architectural registers in one or more sets of architectural registers 203. The processor includes a decode unit or decoder 224 to decode the instructions 201. The decode unit may output one or more relatively lower-level instructions or control signals (e.g., one or more microinstructions, micro-operations, micro-code entry points, or other decoded instructions or control signals) that are derived from each of the instructions.

An allocation unit 225 is coupled with the decode unit. The allocation unit may reserve or allocate resources to be used by the decoded instructions or control signals output from the decoder. Possible examples of such resources include, but are not limited to, entries in a scheduler unit 226 (e.g., entries in one or more reservation stations), reorder buffer (ROB) entries, load/store queue entries, branch buffer entries, and the like.

The register rename unit 212 is coupled with the allocation unit 225. The register rename unit may receive at least some input architectural register identifiers 210 indicated by the instructions 201 and may be operative to rename at least some of these input architectural register identifiers to corresponding output physical storage location identifiers 218 that identify corresponding ones of the physical storage locations 220. For example, the source architectural registers of a given instruction may be renamed to physical storage locations that were previously allocated to the same architectural register (e.g., which was the destination architectural register of a prior instruction), and the destination architectural register of the given instruction may be allocated to one of the free/available physical storage locations. Any of the previously described types of architectural registers may optionally be renamed. In some embodiments, the register rename unit may include two or more register rename storage structures 213 to store physical storage location identifiers 214. One significant challenge is that an error 215 (e.g., a soft error, hard error, logic error, or a combination thereof) may potentially occur in the physical storage location identifiers while they are stored in the register rename storage structures and/or when they are transmitted between such storage structures. In some embodiments, the register rename unit 212 may include and/or use the embodiments disclosed elsewhere herein (e.g., in conjunction with FIGS. 3-6).

Referring again to FIG. 2, a scheduler unit 226 is coupled with the register rename unit 212. The scheduler unit may include one or more reservations stations, one or more instruction queues, one or more instruction buffers, one or more instruction windows, or the like. In some cases, the scheduler unit may represent a centralized unit, whereas in other cases the scheduler unit may include distributed scheduler sub-units (e.g., each co-located with a corresponding one of the execution unit 227). The instructions or control signals output from the decode unit may be dispatched to the scheduler unit. The scheduler unit may also receive the output physical storage location identifiers 218. The scheduler unit may store the instructions or control signals output from the decode unit that are waiting to execute due to unavailability of operands and/or resources. By way of example, if the operands are not available, the scheduler unit may monitor communications on a bus or other interconnect for the operands to become available (e.g., broadcasts of destination physical storage location identifiers when an execution unit stores results to them). When all needed operands and/or resources for an instruction or control signal are available, the instruction or control signal may be issued to one or more execution units 227. Instead of the instructions or control signals being scheduled/issued and executed in the original program order, they may be scheduled/issued and executed out-of-order based on the availability of needed data and/or resources.

The set of physical storage locations 220 are coupled with the scheduler unit 226. The various types of physical storage locations previously mentioned for FIG. 1 are suitable. In the illustration, the architectural registers 203 are shown in dashed lines to indicate that they may or may not actually exist as a set of actual physical registers.

The one or more execution units 227 are coupled with the set of physical storage locations 220. The execution unit(s) may receive the operands needed to perform the instructions (e.g., from the physical storage locations). The execution units may perform the operations specified by the instructions, and in the case of data producing instructions may generate result operands. The result operands may be stored to the destinations (e.g., to destination physical storage locations 220). In some cases, the destination physical storage location identifiers may be broadcast on a bus or other interconnect. The scheduler unit 226 may monitor for such broadcasts or communications, and may match the broadcast destination physical storage location identifiers against those needed as source operands by its queued instructions or control signals.

A retirement unit, or other commit unit 228, is coupled with the execution units 227, the set of physical storage locations 220, and the register rename unit 212. The commit unit may be operative to commit instructions in original program order. For example, the commit unit may wait to commit each instruction until all older/prior instructions ahead of it in the original program order have already been committed. Committing the instructions may include committing the results of the instructions (e.g., which may be stored in the physical storage locations 220) to architectural state. This may be done in different ways depending upon how the physical storage locations are implemented. As another example, this may include transferring data from either a reorder buffer, or a rename buffer, to a set of architectural registers.

To avoid obscuring the description, a relatively simple processor 202 has been shown and described. However, the processor may optionally include other processor components. For example, various embodiments may include different combinations and configurations of the components shown and described for any of FIGS. 7B, 8A, 8B. The components of the processor may be coupled together in known ways to allow them to operate.

Figure 3:
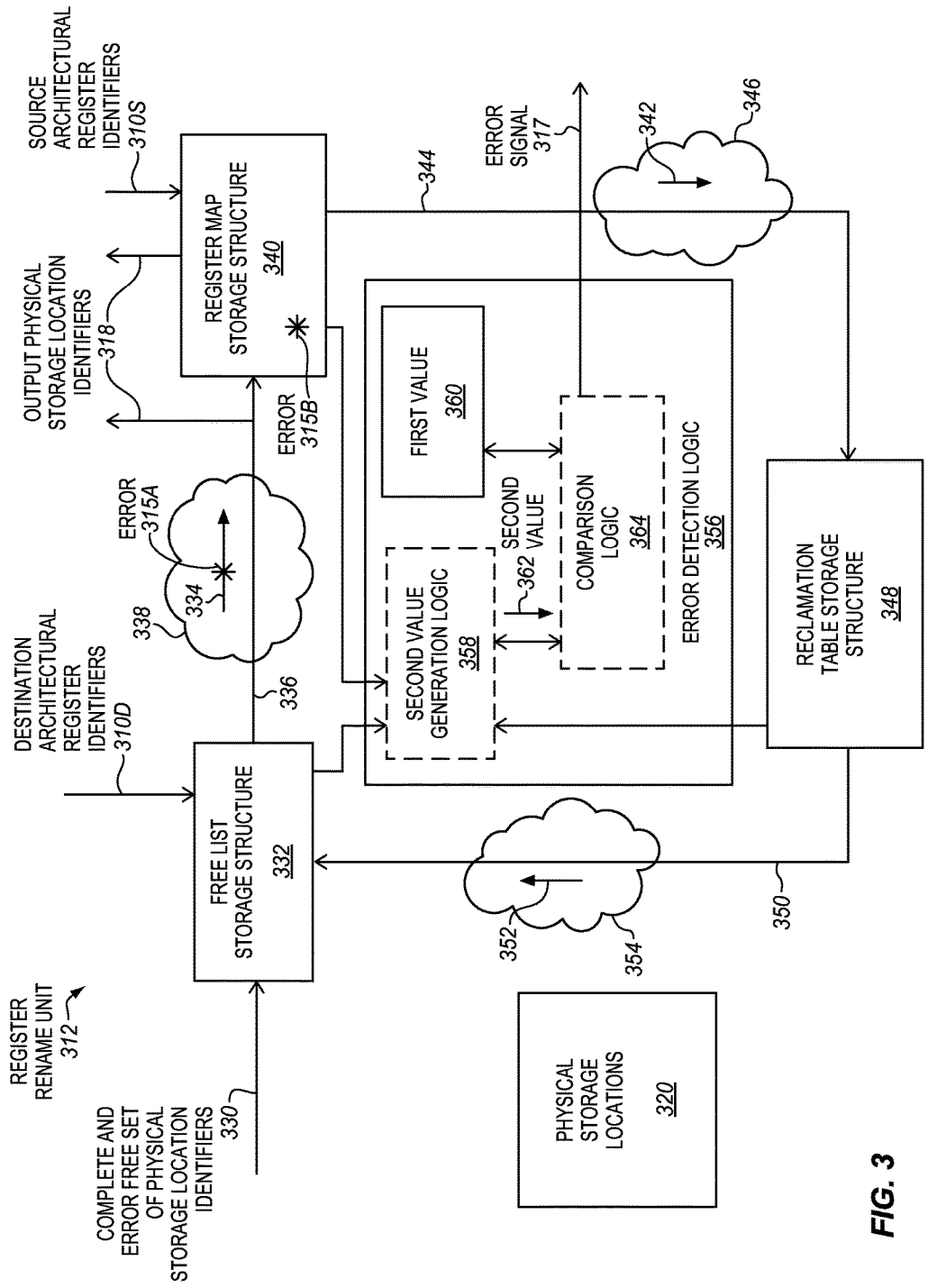
FIG. 3 is a block diagram of an embodiment of a register rename unit that is operative to detect errors in physical storage location identifiers.

FIG. 3 is a block diagram of an embodiment of a register rename unit 312 that is operative to detect errors in physical storage location identifiers. In some embodiments, the register rename unit 312 may optionally be included in the processor 102 of FIG. 1 and/or the processor 202 of FIG. 2. Alternatively, the register rename unit 312 may optionally be included in a similar or different processor or other apparatus. Moreover, the processor 102 and/or the processor 202 may each include either a similar or different register rename unit than the register rename unit 312.

The register rename unit 312 includes a free list storage structure 332. The free list storage structure broadly represents a first register rename storage structure. When register renaming is performed with a merged rename and architectural register file, a complete set of physical registers, broadly representing a complete set of physical storage locations 320, typically larger in number than the number of architectural registers being renamed, may be used. Initially, all of these physical storage locations may be "free" or available to be allocated for use in register renaming. Initially, a complete and error free set of the physical register indices, physical register identifiers, or other physical storage location identifiers 330 may be input to and stored in the free list storage structure 332. By way of example, these physical storage location identifiers may be stored in the free list storage structure during initialization of the register rename unit and/or prior to performing register renaming, such as, for example, at boot time, at reset, at restart, at initialization, or the like. The free list storage structure may have fields, entries, storage locations, or other portions, to store the physical storage location identifiers.

Each of the physical storage location identifiers of the complete and error free set 330 may be operative to uniquely identify a different one of the complete set of physical storage locations 320 to be used for register renaming. For example, each of the physical storage location identifiers of the complete and error free set may uniquely identify a different physical register of the merged rename and architectural register file. Typically, each of the physical storage location identifiers may have a same number of bits, and the number of bits may be at least sufficient to uniquely identify any one of the physical storage locations. As one illustrative example, in the case of the merged rename and architectural register file having sixteen physical registers, each of the physical register identifiers may have 4-bits. In such a case, the complete set of 4-bit physical register indices or identifiers may consist of the values 0000, 0001, 0010, 0011, 0100, 0101, 0110, 0111, 1000, 1001, 1010, 1011, 1100, 1101, 1110, and 1111. Typically, in actual practice, many more than sixteen different physical storage locations may often be used. For example, often there may be from about sixty-four to one thousand twenty-four different physical storage locations, although the scope of the invention is not limited to any known number. By way of example, a 6-bit physical storage location identifier may allow uniquely selecting any one of up to sixty-four physical storage locations, a 7-bit identifier may allow uniquely selecting any one of up to one hundred twenty-eight physical storage locations, an 8-bit identifier may allow uniquely selecting any one of up to two hundred fifty-six physical storage locations, a 9-bit identifier may allow uniquely selecting any one of up to five hundred twelve physical storage locations, or a 10-bit identifier may allow uniquely selecting any one of up to one thousand twenty-four physical storage locations. In some embodiments, some of the possible bit combinations may not be used to identify physical storage locations (e.g., there may be less physical storage locations than could be indexed or identified by all possible bit combinations of the physical storage location identifiers).

As instructions are performed by the processor, the register rename unit may be operative to map input destination architectural register identifiers 310D, and input source architectural register identifiers 310S, which are to be indicated by instructions being performed, to corresponding output physical storage location identifiers 318. For example, the register rename unit and/or the free list storage structure may be operative to select free or available physical storage location identifiers from the free list storage structure and map or allocate them to rename destination architectural registers (e.g., corresponding to input destination architectural register identifiers 310D) of the instructions being performed. If there are currently no free or available physical storage location identifiers, the register rename unit or process may be temporarily stalled until an older instruction commits, thereby freeing a physical storage location and its corresponding physical storage location identifier (e.g., from a reclamation table storage structure 348), allowing it to be returned to the free list storage structure. By way of example, in various embodiments, the free list storage structure may be implemented as a table, array, buffer, or queue storage structure, such as, for example, a first in, first out (FIFO) storage structure, a circular buffer storage structure, or the like.

The mapped or allocated physical storage location identifiers 334, corresponding to the destination architectural registers of instructions, may also be transmitted, conveyed, otherwise provided from the free list storage structure to a register map storage structure 340. This may occur over a first conductive path 336 that couples the free list storage structure with the register map storage structure. The register map storage structure broadly represents a second register rename storage structure. The register map storage structure may be operative to store the most current mappings of physical storage location identifiers to their corresponding destination architectural registers. The register map storage structure may have fields, entries, storage locations, or other portions to store the received physical storage location identifiers. By way of example, the register map storage structure may include a different entry for each of the architectural registers that is to be renamed, and the entries may be used to store the physical storage location identifiers mapped to the corresponding architectural registers, although other configurations are also contemplated.

The register map storage structure 340 may be consulted, during the register rename process, to determine physical storage locations that are mapped to architectural registers that are indicated as source architectural registers (e.g., corresponding to the input source architectural register identifiers 310S) by the instructions being performed. If no errors are detected, as will be explained further below, the determined physical storage location identifiers may be output or provided as the output physical storage location identifiers 318 (e.g., to a scheduler unit) corresponding to the source architectural registers of the instructions being performed. By way of example, in various embodiments, the register map storage structure may be implemented as a table, array, buffer, or queue storage structure, such as, for example, a direct mapped table storage structure or a direct mapped array storage structure. Specific examples of suitable register map storage structures include, but are not limited to, a register alias table (RAT), a register status table (e.g., as used in the Tomasulo algorithm), or the like.

In some embodiments, each entry in the register map storage structure 340 may also store a readiness indication (e.g., a readiness bit). The readiness indication may indicate "not ready" if a queued instruction (e.g., in a scheduler unit) that will write to the destination physical storage location has not yet been performed, or may indicate "ready" if a result or destination operand has already been stored to the destination physical storage location. When the instructions are executed by the execution units, the destination physical storage location identifiers used to store their results or destination operands may be broadcast or otherwise signaled (e.g., on a bus or other interconnect coupled with the register rename unit). In one aspect, the register map storage structure may be operative to monitor for such broadcasts or signals to identify the destination physical storage location identifiers. When matches are detected, the register map storage structure may configure the readiness indications to indicate that the physical storage locations are ready.

As mentioned above, free or available physical storage location identifiers may be allocated from the free list storage structure 332. However, because there is a finite number of the physical storage locations 320 and/or their corresponding physical storage location identifiers, additional free physical storage location identifiers cannot be allocated indefinitely from the free list storage structure without an ability to free or reclaim the previously allocated physical storage location identifiers. One possible approach that may be used to free or reclaim the previously allocated physical storage location identifiers, which have been previously allocated for earlier/prior instructions in original program order, is based on determining that the architectural registers that they are mapped to have been overwritten by committed later/subsequent instructions in original program order.

Consider for example an earlier/prior instruction in original program order that writes to a given destination architectural register (e.g., R8), and a later/subsequent instruction in original program order that also writes to the given destination architectural register (e.g., R8). Initially, a first physical storage location (e.g., physical register P3) may be allocated from the free list storage structure to rename the given destination architectural register (e.g., R8) for the earlier/prior instruction. This mapping of the first physical storage location (e.g., P3) to the given destination architectural register (e.g., R8) may be stored or preserved in the register map storage structure. Subsequently, for the later/subsequent instruction, a second different physical storage location (e.g., physical register P4) may be allocated from the free list storage structure to rename the given destination architectural register (e.g., R8). This updated mapping of the second different physical storage location (e.g., P4) to the given destination architectural register (e.g., R8) may be stored or preserved in the register map storage structure. The prior mapping of the first physical storage location (e.g., P3) to the given destination architectural register (e.g., R8) is no longer the most current mapping, and it may be removed from the register map storage structure.

However, it may be desirable to preserve this mapping (e.g., of the first physical storage location (e.g., P3) to the given destination architectural register (e.g., R8)) so that other instructions may read the earlier/prior value written to the first physical storage location (e.g., P3). In the illustrated example embodiment, this prior mapping 342 (e.g., the physical storage location identifier and the mapped architectural register identifier) may be transmitted, conveyed, otherwise provided from the register map storage structure to the reclamation table storage structure 348. The reclamation table storage structure broadly represents a third register rename storage structure. This may occur over a second conductive path 344 that couples the register map storage structure with the reclamation table storage structure. The reclamation table storage structure may be operative to store such prior or outdated mappings that have been displaced from the register map storage structure. The reclamation table storage structure may have fields, entries, storage locations, or other portions to store the physical storage location identifiers and/or the prior mappings. By way of example, in various embodiments, the reclamation table storage structure may be implemented as a table, array, buffer, or queue storage structure, such as, for example, a first in, first out (FIFO) storage structure, a circular buffer storage structure, or the like. Specific examples of a suitable reclamation table storage structures include, but are not limited to, a post retirement reclamation table storage structure (PRRT), a reorder buffer (ROB), and other ROB assist structures.

In one aspect, the prior or outdated mappings that have been displaced from the register map storage structure 340 may be stored in the reclamation table storage structure 348 until the instructions that caused the displacements retire or otherwise commit. For example, the first physical storage location (e.g., P3) previously mapped to the given destination architectural register (e.g., R8) for the earlier/prior instruction may safely no longer be needed when the later/subsequent instruction that wrote a result to the same given destination architectural register (e.g., R8) retires or otherwise commits. When the later/subsequent instruction commits, its result is committed to architectural state, and at this point the previous value in that given architectural register is no longer needed (e.g., no instruction will use that prior value). This may allow the previously mapped physical storage location identifier to be reclaimed or freed for further allocation for register renaming. In such cases, the reclamation table storage structure may be operative to transmit, convey, otherwise provide the reclaimed or freed previously mapped physical storage location identifiers 352 to the free list storage structure 332. This may occur over a third conductive path 350 that couples the reclamation table storage structure with the free list storage structure.

Now, as previously mentioned, one significant challenge is that the register rename unit 312 may tend to be susceptible to certain types of errors, such as, for example, soft errors, hard errors, logic errors, and combinations thereof. Such errors may potentially occur in the physical storage location identifiers while they are stored in any of the various storage structures of the register rename unit. By way of example, an error 315B may occur to a physical storage location identifier while it is stored in the register map storage structure. Such an error may change one or more bits of the physical storage location identifier. Such errors may also potentially occur in the physical storage location identifiers while they are being transmitted, conveyed, or otherwise provided between the various storage structures of the register rename unit. The first, second, and third conductive paths 336, 344, 350 may, respectively, go through a first, second, and third set of intervening conductive materials and/or structures 338, 346, 354. These intervening conductive materials and/or structures may include, but are not limited to, one or more buses or other interconnects, latches, sequential logic, combinational logic, circuitry, and the like, which are used to conduct and support the transmission or conveyance of the physical storage location identifiers between the various storage structures. A more detailed understanding of these conductive materials and/or structures is not necessary to understand the present disclosure. Mainly, it is worth mentioning that errors (e.g., an error 315A) may also potentially occur in the physical storage location identifiers while they are being conveyed or provided between the various storage structures anywhere along the conductive paths and/or within the conductive materials and/or structures.

It would be useful and beneficial to be able to detect such errors in the physical storage location identifiers. For example, errors that change physical storage location identifiers (e.g., one or more of their bits) may cause a dataflow violation. As one example, a changed or erroneous physical storage location identifier may cause an instruction to incorrectly depend on the wrong input data. As another example, a changed or erroneous physical storage location identifier may cause an instruction to incorrectly overwrite a register having another instructions result/output before it has been read by one of its dependent instructions and/or may cause one of its dependent instructions to read the wrong value. In some cases, if such errors are not detected, they may cause a machine check exception and/or a system crash. In other cases, if such errors are not detected, they may potentially cause erroneous results or compromise functional correctness without any warning (e.g., cause silent data corruption (SDC)). In addition, certain implementations may impose relatively strict target error rates for different types of errors. For example, this may be the case for server implementations (e.g., large scale data centers), mission critical implementations, and functional safety certified implementations (e.g., automotive applications). However, the detection of such errors may help to avoid such problems. For example, in some cases, if such errors are detected, firmware of the processor and/or an operating system may be able to correct the errors. In other cases, if such errors are detected, firmware of the processor and/or an operating system may be able to handle the errors so they do not cause a machine check exception and/or a system crash. In still other cases, if such errors are detected, firmware of the processor and/or an operating system may be able to handle the errors so they at least do not cause erroneous results or compromise functional correctness. The ability to detect such errors may also be useful and beneficial to reduce debug time and/or effort.

Referring again to FIG. 3, in some embodiments, the register rename unit may be operative to perform error detection and/or detect errors in the physical storage location identifiers being used by and/or stored within and/or contained within the register rename unit. As shown in the illustrated embodiment, the register rename unit may optionally include an embodiment of error detection logic 356. In other embodiments, the embodiment of the error detection logic may optionally be separate from but coupled with the register rename unit. The error detection logic may be implemented in hardware, firmware, software, or a combination (e.g., primarily hardware and/or firmware potentially with a lesser amount of software). In some embodiments, the error detection logic may include at least some on-die circuitry (e.g., transistors, integrated circuitry, etc.) or other hardware and/or on-die non-volatile memory storing code (e.g., microcode) or other firmware.

In some embodiments, the register rename unit 312 and/or the error detection logic 356 may be operative to detect violations of certain characteristics of the physical storage location identifiers and/or their use in register renaming as indicative of errors (e.g. soft errors, hard errors, timing issues, logical bugs, etc.). One such characteristic is that typically there is a fixed number of physical storage location identifiers in the complete set 330, and typically they each have a fixed value (e.g., a fixed binary value of a specific bit length). Another such characteristic is that typically, at a given time (e.g., optionally/possibly disregarding certain times when physical storage location identifiers are being transferred between register rename storage structures), each of the physical storage location identifiers of the complete set 330 should generally be stored in one, but only one, of a set of register rename storage structures. For example, a physical storage location identifier may either be free or allocated, may only be freed if it is currently allocated, and may only be allocated if it is currently free.

By way of example, considering the embodiment of FIG. 3, at a given time, each of the physical storage location identifiers of the complete set should generally be stored in one, but only one, of the free list storage structure, the register map storage structure, and the reclamation table storage structure (e.g., optionally/possibly disregarding certain times when the physical storage location identifiers are being transmitted between the storage structures). Yet another such characteristic is that typically, a physical storage location identifier is read or removed from one register rename storage structure before it is written or stored into another register rename storage structure. In some embodiments, errors that cause duplication of a physical storage location identifier (e.g., change one physical storage location identifier so it is equal to another physical storage location identifier) or "leakage" or loss of a physical storage location identifier (e.g., change a physical storage location identifier so there is no physical storage location identifier with its value) may cause or result in such characteristics being violated and may be detected as errors.

In some embodiments, the register rename unit 312 and/or the error detection logic 356 may be operative to detect an error when a first value 360, which is equal to a bitwise exclusive OR (XOR), or a sum, combination of logical operations, or other operations, on the complete and error free set of the physical storage location identifiers 330, does not equal or is otherwise inconsistent with a second value 358. The operation should provide a value that can be meaningfully compared with another value, that should represent the content of the set of physical storage location identifiers that it represents, regardless of the order in which the physical storage locations are operated on (e.g., a commutative property), and should have an inverse operation that removes a physical storage location identifier from a value as well as an operation that adds the physical storage location identifier to the value. In the case of an XOR operation, the XOR operation may serve as the inverse of itself by XORing the same physical storage location identifier twice. Other examples of suitable operations include a sum or addition with its inverse operation subtraction. Yet another suitable operation is a count of the number of physical storage location identifiers. In some embodiments, the second value may "represent," "stand for," "computationally simulate," "computationally mimic," or "be computationally equivalent to if there are no errors," the same operation on the physical storage location identifiers that are stored in the plurality of register rename storage structures and/or otherwise within the register rename unit at a given time (e.g., sometime after the start of register renaming). The register rename unit and/or the error detection logic may have comparison logic 364 to compare the first and second values.

Since the number of physical storage location identifiers in the complete set 330 is typically fixed, and since each of the complete and error free set of physical storage location identifiers typically has a fixed binary value (e.g., absent any errors) that is known in advance, an XOR operation, sum operation, or certain other types of operations performed on the complete and error free set of physical storage location identifiers may yield a constant or predetermined value for the first value 360. As one specific illustrative example, in some embodiments, the first value 360 may be equal to an XOR of the complete and error free set of the physical storage location identifiers 330, although the scope of the invention is not so limited. As another specific illustrative example, in some embodiments, the first value 360 may be equal to a sum of the complete and error free set of the physical storage location identifiers 330, although the scope of the invention is not so limited. Commonly, the first value may generally be determined, calculated, or generated in advance of performing register renaming. In one aspect, the first value may optionally be hard wired or hard programmed into the processor. In another aspect, the first value may optionally be loaded into the processor during initialization of the register rename unit and/or prior to performing register renaming, such as, for example, at boot time, at reset, at restart, at initialization, or the like. In the illustrated embodiment, the first value is shown as being part of the register rename unit and/or error detection logic although it may also be separate and coupled or otherwise accessible.

In some embodiments, the register rename unit and/or the error detection logic may optionally include second value generation logic 358 to calculate or otherwise generate the second value 362. As shown, in the illustrated example embodiment, the second value generation logic may be coupled with the free list storage structure, the register map storage structure, and the reclamation table storage structure. In some embodiments, the second value 362 may "represent," "stand for," "computationally simulate," "computationally mimic," or "be computationally equivalent to if there are no errors" the operation (e.g., the same operation as that for the first value) on the physical storage location identifiers that are stored in the register rename storage structures and/or otherwise within the register rename unit at some given point in time after the start of register renaming (e.g., after a period of time during which one or more errors may possibly have occurred). As one specific illustrative example, the second value generation logic 358 may be operative to generate the second value 362 to represent the XOR of the physical storage location identifiers that are stored in the register rename storage structures (e.g., the free list storage structure, the register map storage structure, and the reclamation table storage structure) at the given point in time, although the scope of the invention is not so limited. For clarity, as used herein, for the second value to "represent," "stand for," "computationally simulate," or "computationally mimic," or "be computationally equivalent to if there are no errors" the operation on the physical storage location identifiers that are stored in the plurality of register rename storage structures and/or otherwise within the register rename unit, may mean, but does not necessarily mean, that the operation is actually performed on the physical storage location identifiers that are stored in the plurality of register rename storage structures and/or otherwise within the register rename unit. Rather, as will be discussed further below, the second value may be based on one or more running values (e.g., a running sum, a running XOR, etc.) that may "represent," "stand for," "computationally simulate," or "computationally mimic," or "be computationally equivalent to if there are no errors" all physical storage location identifiers that are stored in a corresponding register rename storage structure by taking into account over time what physical storage location identifiers are stored into and removed from the register rename storage structure. In some embodiments, the second value generation logic may be operative to generate the second value such that the second value will be equal to the operation if performed on all of the physical storage location identifiers that are stored in the plurality of register rename storage structures and/or otherwise within the register rename unit if there are no errors in any of these physical storage location identifiers.

If no errors have occurred in the physical storage locations identifiers stored within or otherwise within the register rename unit, then the second value 362 should generally be equal to or otherwise consistent with the first value 360. However, if one or more errors have occurred in the physical storage locations identifiers stored within or otherwise within the register rename unit, then the second value may not be equal to or otherwise consistent with the first value. As one illustrative example, an error that changes a given physical storage location identifier, which is one of the inputs to an XOR operation, may also change the result of the XOR operation. Such inconsistencies between the first value 360 and the second value 362 may be detected as possible errors. In such cases, in some embodiments, the register rename unit and/or the error detection logic may be operative to output or provide an error signal 317 (e.g., to other logic of the processor, an operating system), which without limitation may respond accordingly (e.g., possibly try to fix the error, mitigate the effect of the error, etc.). In some cases, depending upon the particular type of operation used to generate the second value 362, two or more errors may possibly cancel each other out and not collectively cause a change in the second value, in which case the errors may not be detected, although other errors and combinations of errors may generally be detectable. Generally, the errors may also be detected when they occur within the first, second, and third set of intervening conductive materials and/or structures 338, 346, 354 (e.g. when the physical storage location identifiers are transmitted or conveyed through such materials and/or structures), as long as they make the first and second values inconsistent with one another.

As shown, in some embodiments, the second value generation logic 358 may not directly lie on and/or be directly disposed on and/or directly connected along the write access paths between and coupling the various register rename storage structures. This may help to avoid adding an additional operation that takes time on these write access paths, which may often already tend to have relatively strict timing constraints.

Figure 4:
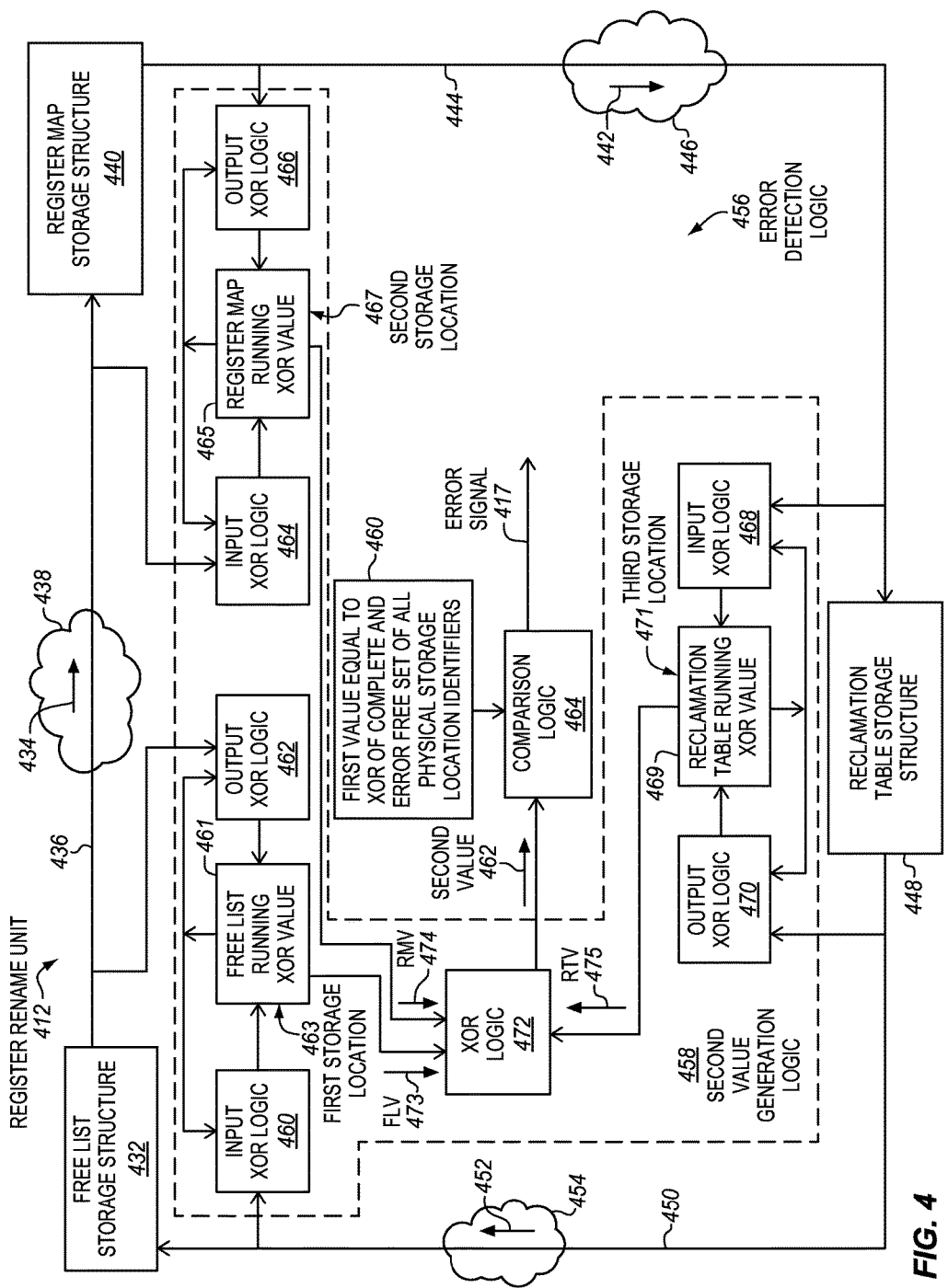
FIG. 4 is a block diagram of an example embodiment of a register rename unit that is operative to detect errors in physical storage location identifiers, and which has a more detailed example embodiment of second value generation logic.

FIG. 4 is a block diagram of an example embodiment of a register rename unit 412, which is operative to detect errors in physical storage location identifiers, and which has a more detailed example embodiment of second value generation logic 458. The register rename unit includes a free list storage structure 432, a register map storage structure 440, a reclamation table storage structure 448, first, second, and third conductive paths 436, 444, 450, and first, second, and third set of intervening conductive materials and/or structures 438, 446, 454. The register rename unit and/or the error detection logic 456 includes a first value 460, and comparison logic 464. These components may optionally be the same as or similar to (e.g., have any one or more characteristics that are the same as or similar to) the correspondingly named components of FIG. 3. To avoid obscuring the description, the different and/or additional characteristics of the embodiment of FIG. 4 will primarily be described without repeating all the characteristics which may optionally be the same or similar to those described for the embodiment of FIG. 3.

The illustrated example embodiment of FIG. 4 is based on a bitwise exclusive OR (XOR) operation, although the scope of the invention is not so limited. In other embodiments other operations may optionally be used, such as, for example, a sum, a combination of logical operations, or other operation that will be apparent to those skilled in the art and having the benefit of the present disclosure. XOR operations are a type of bitwise logical operations that have a property that an output bit of the XOR operation is set to one only if only one of its two input bits is set (i.e., binary 1) and the other input is reset (i.e., binary 0), and otherwise the output bit of the XOR operation is cleared to zero (e.g., 1 XOR 1=0, 0 XOR 1=1, 1 XOR 0=1, and 0 XOR 0=0). As one specific example, 1110 XOR 1001 is equal to 0111. The XOR operation has a commutative property such that changing the order of the operands does not change the result. For example, A XOR B equals B XOR A. The XOR operation also has an associative property such that the order in which operations are performed on a sequence of operands does not matter. For example, A XOR (B XOR C) equals (A XOR B) XOR C. Such properties allow the physical storage location identifiers to be XOR'd in various commutative and associative orders. Other operations with analogous properties may also potentially be used instead. In one aspect, the bitwise XOR may be performed on physical storage location identifiers to generate column parity-like bits.

In this embodiment, the first value 460 is equal to an XOR of the complete and error free set of all physical storage location identifiers. The first value may represent a constant or predetermined value that may optionally be generated in advance. The first value may optionally be hard wired into the processor or optionally loaded or stored into a storage of the processor prior to register renaming (e.g., at or around boot time).

In this embodiment, the second value generation logic 458 includes a different corresponding portion for each of the free list storage structure, the register map storage structure, and the reclamation table storage structure. Specifically, a first portion corresponding to the free list storage structure includes an input XOR logic 460, an output XOR logic 462, and a first storage location 463 to store one or more bits. Each set of XOR logic may include one or more XOR gates. The first storage location may have one or more bit storage locations. In one embodiment, the first storage location may be a register, although the scope of the invention is not so limited.

The input XOR logic 460 has a first input coupled with an input to the free list storage structure 432 to receive physical storage location identifiers 452 transmitted to the free list storage structure from the reclamation table storage structure 448. The input XOR logic 460 has a second input coupled with an output of the first storage location 463 to receive a free list running XOR value 461, which is to be stored or maintained in the first storage location 463, each time a physical storage location identifier is transmitted from the reclamation table storage structure to the free list storage structure. An output of the input XOR logic 460 is coupled with a first input to the first storage location 463 to provide an XOR result representing an updated free list running XOR value to the first storage location 463.

Similarly, the output XOR logic 462 has a first input coupled with an output of the free list storage structure 432 to receive physical storage location identifiers 434 transmitted from the free list storage structure to the register map storage structure 440. The output XOR logic 462 has a second input coupled with an output of the first storage location 463 to receive the free list running XOR value 461, each time a physical storage location identifier 434 is output or transmitted from the free list storage structure to the register map storage structure. An output of the output XOR logic 462 is coupled with a second input to the first storage location 463 to provide an XOR result representing an updated free list running XOR value to the first storage location 463.

The second value generation logic 458 also includes a second portion corresponding to the register map storage structure. The second portion includes an input XOR logic 464, an output XOR logic 466, and a second storage location 467. These may be coupled analogously as described immediately above with the inputs and outputs of the register map storage structure to perform XORs of a register map running XOR value 465 maintained or stored in the second storage location with physical storage location identifiers 434 input to, and physical storage location identifiers 442 output from, the register map storage structure.

Likewise, the second value generation logic 458 also includes a third portion corresponding to the reclamation table storage structure. The third portion includes an input XOR logic 468, an output XOR logic 470, and a third storage location 471. These may be coupled analogously as described immediately above with the inputs and outputs of the reclamation table storage structure to perform XORs of a reclamation table running XOR value 469 maintained or stored in the third storage location with physical storage location identifiers 442 input to, and physical storage location identifiers 452 output from, the reclamation table storage structure.

In various embodiments, the number of bits in the first, second, and third storage locations 463, 467, 471 used to track the XOR of the physical storage location identifiers may range from 1-bit to as many bits as a physical storage location identifier (e.g., commonly from about 6-bits to 10-bits). The more bits generally the more comprehensive the error detection coverage, but also generally the greater the die area, manufacturing cost, and/or power consumption. For, example with 1-bit it is possible to detect duplication of a physical storage location identifier with an odd number of ones or a 1-bit corruption. The number of bits is generally independent of the register rename storage structures sizes. It is also not required to increase the size of the generally timing-critical register renaming storage structures. Further, as shown, in some embodiments, the second value generation logic 458 may not directly lie on and/or be directly disposed on and/or directly connected along the write access paths between and coupling the various register rename storage structures. This may help to avoid adding an additional operation that takes time on these write access paths, which may often already tend to have relatively strict timing constraints.

Each running XOR value 461, 465, 469 may "represent," "stand for," "computationally simulate," "computationally mimic," or "be computationally equivalent to if there are no errors," the XOR of the physical storage location identifiers stored in the corresponding register rename storage structure. For example, the free list running XOR value (FLV) 461 may represent the XOR of the physical storage location identifiers stored in the free list storage structure. Similarly, the register map running XOR value (RMV) 465 may represent the XOR of the physical storage location identifiers stored in the register map storage structure. Likewise, the reclamation table running XOR value (RTV) 469 may represent the XOR of the physical storage location identifiers stored in the reclamation table storage structure. As mentioned above, this may be true without the XOR actually being performed on the physical storage location identifiers stored in the corresponding register rename storage structures. Rather, each running XOR value may "represent," "stand for," "computationally simulate," "computationally mimic," or "be computationally equivalent to if there are no errors," the XOR of all the physical storage location identifiers stored in a corresponding register rename storage structure through a running XOR or running value, which is updated by the corresponding input XOR logic with the XOR of each physical storage location identifier stored into the corresponding register rename storage structure, and which is updated by the corresponding output XOR logic with the XOR of each physical storage location identifier removed from the corresponding register rename storage structure. One advantage of using such a running value is that a value representative of all of the physical storage location identifiers stored in the corresponding storage structure may be represented, expressed, simulated, or expressed at any point in time without having to perform the XOR operation instantaneously on all of the physical storage location identifiers stored in the corresponding storage structure each time. This may help to improve performance and/or reduce power and/or reduce the total amount of logic. Although, it is also possible to instantaneously perform such an XOR operation on all the physical storage location identifiers stored in the corresponding storage structure(s), if desired, especially when it is not performed extremely frequently.

Referring again to FIG. 4, an additional set of XOR logic 472 is coupled with the first storage location 463 to receive a free list running XOR value (FLV) 473 (e.g., a copy of 461), is coupled with the second storage location 467 to receive a register map running XOR value (RMV) 474 (e.g., a copy of 465), and is coupled with the third storage location 471 to receive a reclamation table running XOR value (RTV) 475 (e.g., a copy of 469). The additional set of XOR logic may be operative to perform a further XOR operations on these input values to generate the second value 462. Accordingly, the second value may be equal to and/or represent an XOR of multiple running XORs that each correspond to a different register rename storage structure and that each represent the XOR of all physical storage location identifiers stored in the corresponding register rename storage structure at the given time.

The second value 462 may be provided as an input to the comparison logic 464 along with the first value 460. In some embodiments, the comparison logic may be operative to determine whether the generated second value (e.g., FLV XOR RMV XOR RTV) is equal to the first value 460 (e.g., equal to an XOR of the complete and error free set of all physical storage location identifiers). If the first value is equal to the second value, no error may be detected or signaled. Alternatively, the register rename unit may be operative to detect (with certain constraints depending upon the particular types of errors in the event that they can cancel one another) and provide an error signal 417 if the first and second values are not equal. Typically, the illustrated approach may be able to detect a duplication of physical storage location identifier, or a combination of a duplication of one physical storage location identifier and a leakage or loss of another physical storage location identifier. If there is a physical storage location identifier with value zero (e.g., 000000000) and this Pdst gets duplicated, then such an XOR based error detection scheme may not be able to detect it (e.g., since the global XOR remains the same). In some embodiments, if desired, this may optionally be remedied by logically extending all the physical storage location identifier by one bit that has the value binary one (e.g., 0000000001). This bit does not need to be stored in the register rename storage locations, but rather may be used as an input constant in the XOR logic.

In the embodiments of FIG. 4, XOR operations have been shown and described. In other embodiments, a sum may instead optionally be used. In such embodiments, the first value may instead be equal to a sum of the complete and error free set of the physical storage location identifiers. The second value may represent the sum of the physical storage location identifiers that are stored in the set of register rename storage structures at the given time. In some embodiments, the second value may represent the sum through different running sums that each correspond to a different one of the register rename storage structures. By way of example, each input XOR logic may be replaced by an input add or sum logic (e.g., an adder), and each output XOR logic may be replaced by an output subtract logic (e.g., a negative adder, a subtractor, etc.). Likewise, the additional XOR logic 472 may be replaced by an additional add or sum logic. Running sums may be maintained instead of running XOR values. The second value may be equal to the sum of multiple running sums that each correspond to a different one of the register rename storage structures. Each of the running sums may represent the sum of all physical storage location identifiers that are stored in the corresponding register rename storage structure at the given time. For example, the first storage location may maintain or store a free list running sum that represents a sum of all physical storage location identifiers that are stored in the free list storage structure at the given time through adding the inputs and subtracting the outputs over time.

Figure 5:
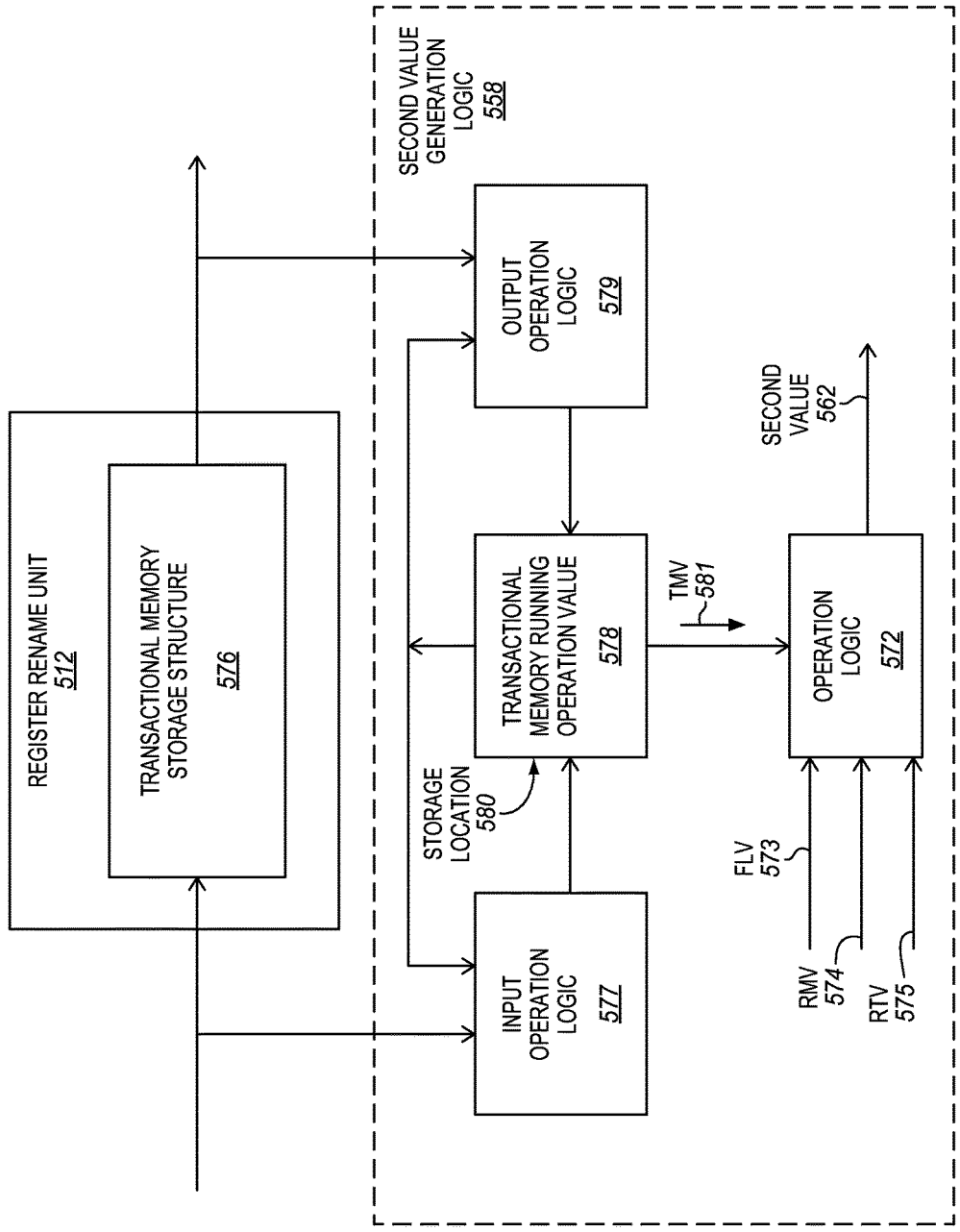
FIG. 5 is a block diagram of an embodiment of a register rename unit that optionally includes a transactional memory storage structure, and an embodiment of second value generation logic that is optionally operative to generate the second value based on a transactional memory running operation value.

FIG. 5 is a block diagram of an embodiment of a register rename unit 512 that optionally includes a transactional memory storage structure 576, and an embodiment of second value generation logic 558 that is optionally operative to generate the second value based on a transactional memory running operation value 578. The register rename unit 512 may optionally be similar to, the same as, or different than, the register name unit 312 of FIG. 3 and/or the register name unit 412 of FIG. 4. The second value generation logic 558 may optionally be similar to, the same as, or different than the second value generation logic 358 of FIG. 3 and/or the second value generation logic 458 of FIG. 4. To avoid obscuring the description, the different and/or additional characteristics of the embodiment of FIG. 5 will primarily be described, without repeating all the characteristics which may optionally be similar to or the same as those described above for the embodiments of FIGS. 3-4.

The transactional memory storage structure 576 may optionally be included in processors that support transactional memory. Transactional memory is sometimes referred to as transactional execution. When transactional memory is being performed, physical storage location identifiers that correspond to an in-progress transaction, may be stored in the transactional memory storage structure. The transactional memory storage structure may be operative to save previous destination physical register identifiers for architectural destination registers on the first write to the architectural register after a transaction begins. The transactional memory storage structure may be used to recover a register map storage structure in the event of a transaction abort and/or to update a free list storage structure when the transaction ends successfully. One specific example of the transactional memory storage structure is a copy on write (COW) storage structure, although the scope of the invention is not so limited.

In this embodiment, the second value generation logic 558 includes a portion corresponding to the transactional memory storage structure. The portion includes an input operation logic 577, an output operation logic 579, and a storage location 580 that is operative to store one or more bits (e.g., a register). In some embodiments, the input and output operation logic may include XOR logic (e.g., XOR gates). In other embodiments, the input operation logic may include add logic (e.g., an adder) and the output operation logic may include subtract logic (e.g., a subtractor or negative adder). Alternatively, other operation logic may optionally be used.

The input operation logic 577 has a first input coupled with an input to the transactional memory storage structure 576 to receive physical storage location identifiers input to the transactional memory storage structure. The input operation logic has a second input coupled with an output of the storage location 580 to receive a transactional memory running operation value (TMV) 578, which is to be stored or maintained in the storage location 580. An output of the input operation logic is coupled with a first input to the storage location 580 to provide an updated transactional memory running operation value to the storage location.

The output operation logic 579 has a first input coupled with an output of the transactional memory storage structure 576 to receive physical storage location identifiers output from the transactional memory storage structure. The output operation logic has a second input coupled with an output of the storage location 580 to receive the transactional memory running operation value (TMV) 578. An output of the output operation logic 579 is coupled with a second input to the storage location 580 to provide an updated transactional memory running operation value to the storage location.

An output of the storage location is coupled with an input of an additional operation logic 572 to provide a transactional memory running operation value 578. In some embodiments, a free list running operation value (FLV) 573, a register map running operation value (RMV) 574, and a reclamation table running operation value (RTV) 575, may also be input to the additional operation logic 572. The additional operation logic may be operative to perform an operation on these input values, and then output a second value 562 (e.g., to comparison logic). By way of example, in the case of XOR being the operation, the additional operation logic may be operative to perform the operation FLV XOR RMV XOR RTV XOR TMV and compare the result to a first value representing the XOR of a complete and error free set of physical storage location identifiers.

It is to be appreciated that such a transactional memory storage structure 576 and the associated portion of the second value generation logic 558 may optionally be omitted in processors that do not support transactional memory or transactional execution. Furthermore, in other embodiments error detection may optionally be performed selectively when transactional memory or transactional execution is not currently being performed (e.g., when not in transactional memory mode). In such embodiments, the transactional memory storage structure 576 and the associated portion of the second value generation logic 558 may also optionally be omitted, if desired.

In some embodiments, error detection checks may optionally be performed at certain favorable times rather than at other times. As one example, certain processors implement clear related actions over several cycles. In such processors and at such times, it is possible that false positive errors may be detected even though there are no true errors. In some embodiments, it may be desirable not to perform the error detection checks during such times. More generally, there may be certain times or periods that are not well defined during which it may be desirable not to perform error detection checks, and instead selectively perform the error detection checks during more well defined times or periods when the behavior of the error detection checks itself may be more well defined or predicable. For example, rather than performing such error detection checks during a recovery phase, it may be better to wait until after the recovery phase has ended. In addition, in some embodiments, it may be desirable to perform the error detection checks when there are no, or relatively few, transmissions of physical storage location identifiers between register rename storage structures, although this is not required. Alternatively, if desired, when physical storage location identifiers are being transmitted between register rename storage structures over multiple cycles, the values of the physical storage location identifiers may be held in shadow state (e.g., latches) and removed from the shadow state (e.g., latches) when they have reached the destination register rename storage structure. Since the paths between the register rename storage structures may have latencies that are relatively deterministic or can be estimated, fixed amounts of time may be used for this. Yet another option is to track using input logic and output logic the state that goes in and out of conductive paths.

Figure 6:
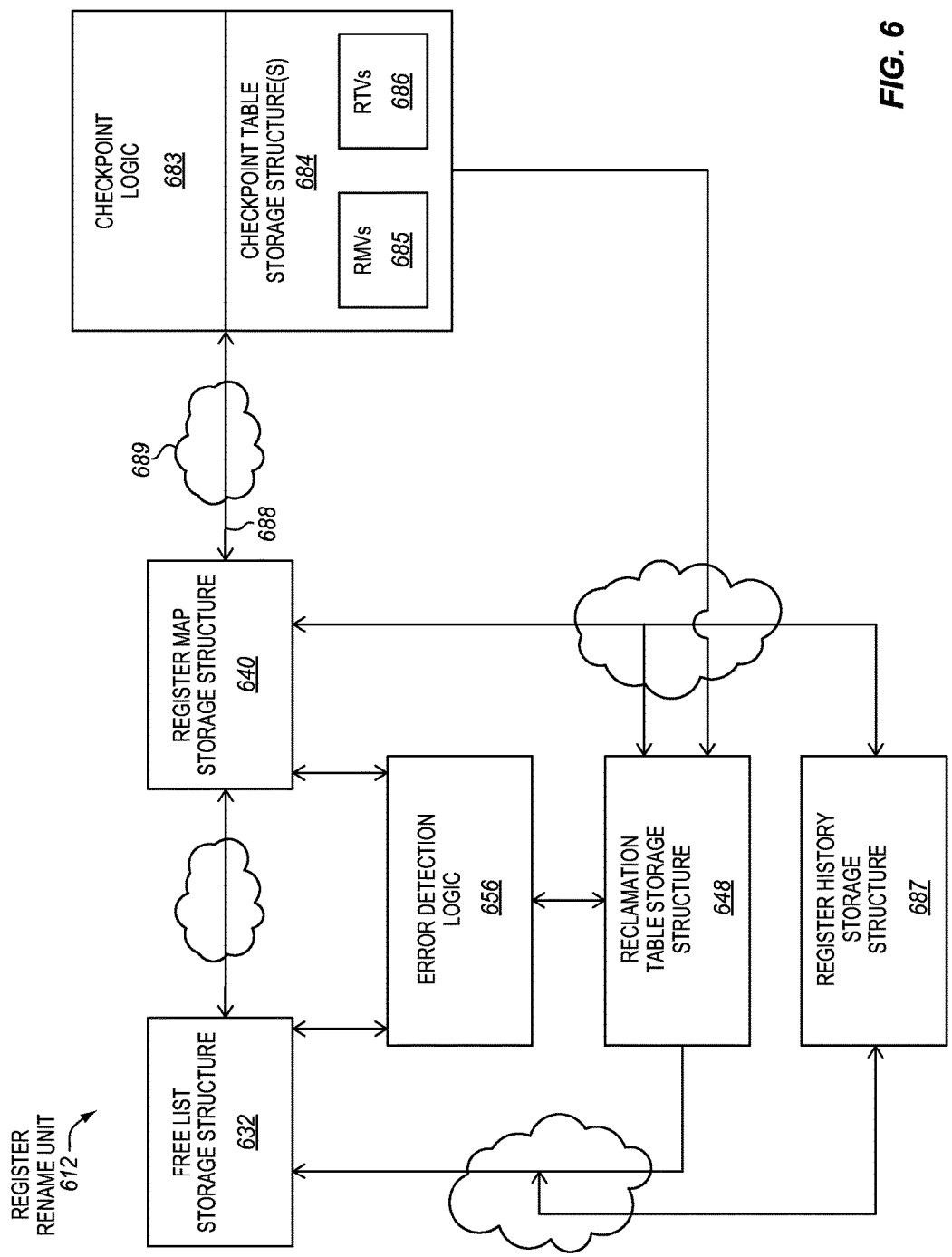
FIG. 6 is a block diagram of an embodiment of a register rename unit that includes one or more checkpoint tables and a register history storage structure.

FIG. 6 is a block diagram of an embodiment of a register rename unit 612 that includes one or more checkpoint table storage structures 684 and a register history storage structure 687. The register rename unit 612 may optionally be similar to, the same as, or different than the register name unit 312 of FIG. 3 and/or the register name unit 412 of FIG. 4. The register rename unit 612 includes a free list storage structure 632, a register map storage structure 640, a reclamation table storage structure 648, and an error detection logic 656. These components may optionally be the same as or similar to (e.g., have any one or more characteristics that are the same as or similar to) the correspondingly named components of FIG. 3 and/or FIG. 4. To avoid obscuring the description, the different and/or additional characteristics of the embodiment of FIG. 6 will primarily be described.

Under certain conditions it may optionally be desired to roll back or rewind the state of the register rename unit 612 (e.g., the register map storage structure 640) to an earlier point in time. For example, this may be the case when there is an exception, a branch miss-predication, a pipeline rollback, a clear, a nuke, or the like. In some embodiments, the one or more checkpoint table storage structures 684 may optionally be used for this purpose. As shown, the checkpoint table storage structure(s) may be coupled with the register map storage structure by an intervening conductive path 688 through a set of intervening conductive materials and/or structures 689. The mappings of physical storage location identifiers to architectural registers stored in the register map storage structure be checkpointed or stored at appropriate times to the one or more checkpoint table storage structures. This may include transmitting or otherwise providing physical storage location identifiers from the register map storage structure to the checkpoint table storage structure(s).

In some embodiments, the register rename unit may optionally include a register history storage structure 687, although this is not required. As shown, the register history storage structure may be coupled with the register map storage structure by an intervening conductive path through a set of intervening conductive materials and/or structures. Mappings of physical register identifiers to architectural registers may be transmitted or otherwise provided from the register map storage structure to the register history storage structure to compliment the checkpoints. The checkpointed mappings stored in the checkpoint table storage structure(s), and the additional mappings stored in the register history storage structure, may together be used to rollback or rewind the state of the register map storage structure to an earlier point in time when needed. For example, the checkpointed state (e.g., just prior to a point of time to roll back to) may be obtained from the checkpoint table storage structure(s), and then mappings obtained from the register history storage structure may be replayed to get to the state of the register map storage structure at the time of the last valid instruction.

In some embodiments, depending upon the particular implementation, the register rename unit may optionally be operative to checkpoint or store additional data in the one or more checkpoint table storage structures 684 to support rewinding or rolling back the state of the register rename unit. For example, this may be useful to help keep operation values used for error detection as disclosed elsewhere herein (e.g., running XOR values) consistent with and/or representative of the physical storage location identifiers stored in their corresponding register rename storage structures. In other implementations, this may not be needed (e.g., if instantaneous operation values are used). By way of example, in some implementations, after a clear the content of the register map storage structure 640 may be recovered as a whole from a checkpoint stored in the at least one checkpoint table storage structure 684, without reading the previous physical storage location identifiers, and without inserting the new physical storage location identifiers through regular read and write ports of the register map storage structure 640. In some cases, this may lead to bypassing the input and output operation logic of the register map storage structure, although in other implementations such logic may not be bypassed. If the input and output operation logic is bypassed, then after such recovery the register map operation value (e.g., the running XOR value) may be inconsistent with and/or unrepresentative of the physical storage location identifiers stored in the register map storage structure (e.g., since they were not processed by the input and output running value generation logic).

In some embodiments, to help to avoid this, the register map operation values (RMVs) 685 may optionally be checkpointed or stored in the at least one checkpoint table storage structure 684. Checkpoint logic 683 may be operative to perform or support such checkpointing. This is in addition to the register map mappings that are conventionally checkpointed. This generally represents a small increase in the amount of data checkpointed (e.g., typically from one bit to on the order of tens of bits). Subsequently, when rewinding or rolling back the state of the register rename unit, the register map storage structure may be walked, and updated based on physical storage location identifiers from the register history storage structure 687 (e.g., through reclamation of physical storage location identifiers from the instructions between the checkpoint and the clear or rollback causing instruction). However, these updates may be done through register map storage structure ports, so the register map operation value (e.g., register map running XOR value) may be updated to reflect the updating physical storage location identifiers so that it remains consistent with, and representative of, the physical storage location identifiers stored in the register map storage structure.

The reclamation table storage structure 648 may often be implemented as a FIFO queue, or like structure, to allow physical storage location identifiers to return to the free list storage structure when appropriate. After a clear, the reclamation table storage structure head pointer may be moved back to the entry that caused the clear without reading out the physical storage location identifiers in between. Therefore, the reclamation table operation value (e.g., the reclamation table running XOR value) may become inconsistent with and/or unrepresentative of the physical storage location identifiers stored in the reclamation table storage structure.

In some embodiments, to help avoid this, reclamation table operation values (RTVs) 686 may optionally be checkpointed or stored in the at least one checkpoint table storage structure 684 (e.g., on every register map storage structure checkpoint). The checkpoint logic 683 may be operative to perform or support such checkpointing. Subsequently, on a clear when the register map storage structure checkpoints and register map operation value (RMVs) 685 are recovered, and the register map storage structure is walked, in some embodiments the reclamation table operation values (RTVs) 686 may also be recovered and walked with the physical storage location identifiers from the register history storage structure 687. Eventually, the reclamation table operation value (e.g., the reclamation table running XOR value) should become consistent with the physical storage location identifiers stored in the reclamation table storage structure. The amount of data to checkpoint for the reclamation table operation value (RTV) is generally quite small (e.g., typically from one bit to on the order of tens of bits).

Figure 7:
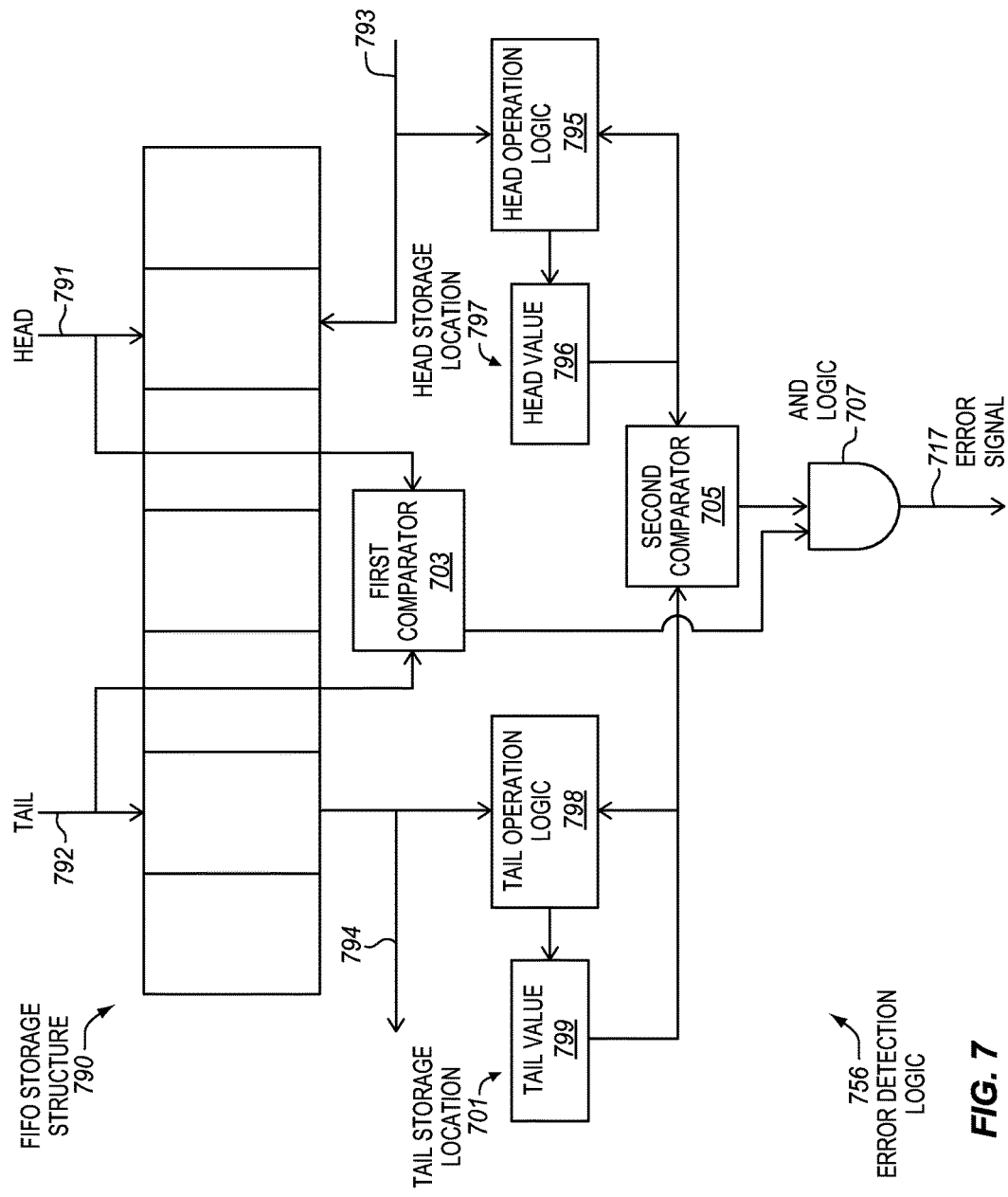
FIG. 7 is a block diagram of an embodiment of a FIFO storage structure and a first example embodiment of error detection logic to detect errors for the FIFO storage structure.

FIGS. 7-8 illustrate two example embodiments of error detection logic for first in, first out (FIFO) storage structures. In some embodiments, the error detection logic and FIFO storage structures may optionally be used in conjunction with register renaming (e.g., as a circular FIFO). For example, the FIFO storage structures, and their associated error detection logic, may optionally be used for one or more of a free list storage structure, a reclamation table storage structure (e.g., a PRRT), or a transactional memory storage structure (e.g., a COW). However, the error detection logic is generally applicable to other FIFO storage structures besides just register rename storage structures.

FIG. 7 is a block diagram of an embodiment of a FIFO storage structure 790 and a first example embodiment of error detection logic 756 to detect errors for the FIFO storage structure. A head 791 of the FIFO storage structure indicates where input physical storage location identifiers 793 are to be enqueued or stored. A tail 792 of the FIFO storage structure indicates where output physical storage location identifiers 794 are to be dequeued or removed. The stored physical storage location identifiers move through the FIFO in order of entry. In other words, the physical storage location identifiers that are introduced into the FIFO storage structure also eventually come out of the FIFO storage structure and in the same order in which they were introduced. In some embodiments, the error detection logic 756 may use this property or characteristic to detect errors in the physical storage location identifiers.

The error detection logic includes a head operation logic 795 and tail operation logic 798. Each of these may include XOR logic, an adder, or other suitable operation log as disclosed elsewhere herein. In the illustrated embodiment, two storage locations instead of one are used to track two running operation values instead of one. The input physical storage location identifiers 793 input to the FIFO storage structure are coupled with an input to the head operation logic 795. An output of a head storage location 797 is also coupled with an input to the head operation logic 795 to provide a running head operation value 796 to the head operation logic. An output of the head operation logic 795 is coupled with an input of the head storage location 797 to provide an output updated running head operation value back to the head storage location 797. The output physical storage location identifiers 794 output from the FIFO storage structure are coupled with an input to the tail operation logic 798. An output of a tail storage location 701 is also coupled with an input to the tail operation logic 798 to provide a running tail operation value 799 to the tail operation logic. An output of the tail operation logic 798 is coupled with an input of the tail storage location 701 to provide an output updated running tail operation value back to the tail storage location 701.

The head 791 and the tail 792 (e.g., their indexes or other positions) are also coupled to be provided to a first comparator 703. By way of example, the first comparator may compare the head and tail for equality and output a true value if they are equal. An output of the first comparator 703 is coupled with logical AND logic 707 (e.g., one or more AND gates).

The output of the head storage location 797 is coupled with a first input to a second comparator 705 to provide the running head operation value. The output of the tail storage location 701 is coupled with a second input to the second comparator 705 to provide the running tail operation value. By way of example, the second comparator may compare the running head operation value and the running tail operation value for lack of equality and output a true value if they are not equal. An output of the second comparator 705 is coupled with the logical AND logic 707.

In some embodiments, the error detection logic 756 may be operative to detect or determine when the positions of the head and tail are equal or the same (e.g., when the tail reaches the head of the queue) and/or when the queue is empty. The first comparator 703 may make this determination by comparing the head and tail (e.g., their indexes or other positions). In some embodiments, when this condition is satisfied, the error detection logic 756 may be operative to detect or determine whether the running head operation value and the running tail operation value are not equal. The second comparator 707 may make this determination. When both conditions are satisfied, an error may be detected and an error signal 717 may be asserted. Otherwise, no error may be detected.

One possible limitation with the error detection logic of FIG. 7 is that errors may only be detected when the head and tail are equal and/or when the queue is empty. In some cases, for some implementations, this may not occur as frequently or consistently as desired (e.g., the tail may be trailing the head for long and/or variable periods of time).

FIG. 8 is a block diagram of an embodiment of a FIFO storage structure 890 and a second example embodiment of error detection logic 856 to detect errors for the FIFO storage structure. The FIFO storage structure includes a head 891 and a tail 892. The error detection logic 856 includes a head operation logic 895 and a head storage location 897 to store a running head operation value 896. The error detection logic 856 also includes a tail operation logic 898 and a tail storage location 801 to store a running tail operation value 899. The error detection logic also includes a first comparator 803, a second comparator 805, and AND logic 807. These components may optionally be the same as or similar to (e.g., have any one or more characteristics that are the same as or similar to) the correspondingly named components of FIG. 7. To avoid obscuring the description, the different and/or additional characteristics of the embodiment of FIG. 8 will primarily be described, without repeating all the characteristics which may optionally be the same or similar to those described for the embodiment of FIG. 7.

The error detection logic 856 also includes a copy value storage location 815 to store a copy value 813. An output of the head storage location 897 is coupled with an input of the copy value storage location 815. A running head operation value may be stored from the head storage location to the copy value storage location as a copy value (e.g., a copy of a running head operation value). Instead of the output of the head storage location being coupled with a first input of the second comparator 805, an output of the copy value storage location 815 is coupled with the first input of the second comparator. Accordingly, the second comparator may be operative to compare a running tail operation value 899 with the copy value 813 and provide a true indication if they are different to the AND logic 807.

The error detection logic 856 also includes a copy index storage location 811 to store a copy index 809. the head 891 is coupled with an input of the copy index storage location 811. The index or other position of the head may be stored to the copy index storage location as the copy index. In some embodiments, this is done at the same index as when the copy value 813 is stored into the copy value storage location 815 so they are consistent. Instead of the head being coupled directly with a first input of the first comparator 803, an output of the copy index storage location 811 is coupled with the first input of the first comparator 803. Accordingly, the first comparator may be operative to compare the copy index 809 with the index or other position of the tail 892, and provide a true indication if they are equal to the AND logic 807.

The copy value storage location 815 and its copy value 813, and the copy index storage location 811 and its copy index 809, allow copies of a running head operation value and its head index or position to be stored or preserved at a given copy time. Then, error detection may be performed whenever the index or position of the tail 892 matches the copy index 809. The error detection may include determining whether the running tail operation value 899 is not equal to the copy value 813. If the copying happens at a fixed index, then the error detection may be performed every time queue size number of entries are dequeued. Or, if the copying happens whenever the tail reaches the copy index, then the error detection may be performed possibly more frequently depending upon the average distance between the head and tail. For example, if this is a third of the size of the FIFO storage structure, then it may tend to happen about three times after queue size number of dequeues. If desired, the error detection may optionally be performed more frequently by capturing and storing more than one copy of the of the index and running head operation value.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 9A is a block diagram illustrating both an exemplary in-order pipeline and an exemplary register renaming, out-of-order issue/execution pipeline according to embodiments of the invention. FIG. 9B is a block diagram illustrating both an exemplary embodiment of an in-order architecture core and an exemplary register renaming, out-of-order issue/execution architecture core to be included in a processor according to embodiments of the invention. The solid lined boxes in FIGS. 9A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 9A, a processor pipeline 900 includes a fetch stage 902, a length decode stage 904, a decode stage 906, an allocation stage 908, a renaming stage 910, a scheduling (also known as a dispatch or issue) stage 912, a register read/memory read stage 914, an execute stage 916, a write back/memory write stage 918, an exception handling stage 922, and a commit stage 924.

FIG. 9B shows processor core 990 including a front end unit 930 coupled to an execution engine unit 950, and both are coupled to a memory unit 970. The core 990 may be a reduced instruction set computing (RISC) core, a complex instruction set computing (CISC) core, a very long instruction word (VLIW) core, or a hybrid or alternative core type. As yet another option, the core 990 may be a special-purpose core, such as, for example, a network or communication core, compression engine, coprocessor core, general purpose computing graphics processing unit (GPGPU) core, graphics core, or the like.

The front end unit 930 includes a branch prediction unit 932 coupled to an instruction cache unit 934, which is coupled to an instruction translation lookaside buffer (TLB) 936, which is coupled to an instruction fetch unit 938, which is coupled to a decode unit 940. The decode unit 940 (or decoder) may decode instructions, and generate as an output one or more micro-operations, micro-code entry points, microinstructions, other instructions, or other control signals, which are decoded from, or which otherwise reflect, or are derived from, the original instructions. The decode unit 940 may be implemented using various different mechanisms. Examples of suitable mechanisms include, but are not limited to, look-up tables, hardware implementations, programmable logic arrays (PLAs), microcode read only memories (ROMs), etc. In one embodiment, the core 990 includes a microcode ROM or other medium that stores microcode for certain macroinstructions (e.g., in decode unit 940 or otherwise within the front end unit 930). The decode unit 940 is coupled to a rename/allocator unit 952 in the execution engine unit 950.

The execution engine unit 950 includes the rename/allocator unit 952 coupled to a retirement unit 954 and a set of one or more scheduler unit(s) 956. The scheduler unit(s) 956 represents any number of different schedulers, including reservations stations, central instruction window, etc. The scheduler unit(s) 956 is coupled to the physical register file(s) unit(s) 958. Each of the physical register file(s) units 958 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 958 comprises a vector registers unit, a write mask registers unit, and a scalar registers unit. These register units may provide architectural vector registers, vector mask registers, and general purpose registers. The physical register file(s) unit(s) 958 is overlapped by the retirement unit 954 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 954 and the physical register file(s) unit(s) 958 are coupled to the execution cluster(s) 960. The execution cluster(s) 960 includes a set of one or more execution units 962 and a set of one or more memory access units 964. The execution units 962 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 956, physical register file(s) unit(s) 958, and execution cluster(s) 960 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 964). It should also be understood that where separate pipelines are used, one or more of these pipelines may be out-of-order issue/execution and the rest in-order.

The set of memory access units 964 is coupled to the memory unit 970, which includes a data TLB unit 972 coupled to a data cache unit 974 coupled to a level 2 (L2) cache unit 976. In one exemplary embodiment, the memory access units 964 may include a load unit, a store address unit, and a store data unit, each of which is coupled to the data TLB unit 972 in the memory unit 970. The instruction cache unit 934 is further coupled to a level 2 (L2) cache unit 976 in the memory unit 970. The L2 cache unit 976 is coupled to one or more other levels of cache and eventually to a main memory.

By way of example, the exemplary register renaming, out-of-order issue/execution core architecture may implement the pipeline 900 as follows: 1) the instruction fetch 938 performs the fetch and length decoding stages 902 and 904; 2) the decode unit 940 performs the decode stage 906; 3) the rename/allocator unit 952 performs the allocation stage 908 and renaming stage 910; 4) the scheduler unit(s) 956 performs the schedule stage 912; 5) the physical register file(s) unit(s) 958 and the memory unit 970 perform the register read/memory read stage 914; the execution cluster 960 perform the execute stage 916; 6) the memory unit 970 and the physical register file(s) unit(s) 958 perform the write back/memory write stage 918; 7) various units may be involved in the exception handling stage 922; and 8) the retirement unit 954 and the physical register file(s) unit(s) 958 perform the commit stage 924.

The core 990 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 990 includes logic to support a packed data instruction set extension (e.g., AVX1, AVX2), thereby allowing the operations used by many multimedia applications to be performed using packed data.

It should be understood that the core may support multi-threading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 934/974 and a shared L2 cache unit 976, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary in-Order Core Architecture

FIGS. 10A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 10A is a block diagram of a single processor core, along with its connection to the on-die interconnect network 1002 and with its local subset of the Level 2 (L2) cache 1004, according to embodiments of the invention. In one embodiment, an instruction decoder 1000 supports the x86 instruction set with a packed data instruction set extension. An L1 cache 1006 allows low-latency accesses to cache memory into the scalar and vector units. While in one embodiment (to simplify the design), a scalar unit 1008 and a vector unit 1010 use separate register sets (respectively, scalar registers 11012 and vector registers 1014) and data transferred between them is written to memory and then read back in from a level 1 (L1) cache 1006, alternative embodiments of the invention may use a different approach (e.g., use a single register set or include a communication path that allow data to be transferred between the two register files without being written and read back).

The local subset of the L2 cache 1004 is part of a global L2 cache that is divided into separate local subsets, one per processor core. Each processor core has a direct access path to its own local subset of the L2 cache 1004. Data read by a processor core is stored in its L2 cache subset 1004 and can be accessed quickly, in parallel with other processor cores accessing their own local L2 cache subsets. Data written by a processor core is stored in its own L2 cache subset 1004 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 10B is an expanded view of part of the processor core in FIG. 10A according to embodiments of the invention. FIG. 10B includes an L1 data cache 1006A part of the L1 cache 1004, as well as more detail regarding the vector unit 1010 and the vector registers 1014. Specifically, the vector unit 1010 is a 16-wide vector processing unit (VPU) (see the 16-wide ALU 1028), which executes one or more of integer, single-precision float, and double-precision float instructions. The VPU supports swizzling the register inputs with swizzle unit 1020, numeric conversion with numeric convert units 1022A-B, and replication with replication unit 1024 on the memory input. Write mask registers 1026 allow predicating resulting vector writes.

Processor with Integrated Memory Controller and Graphics

Figure 11:
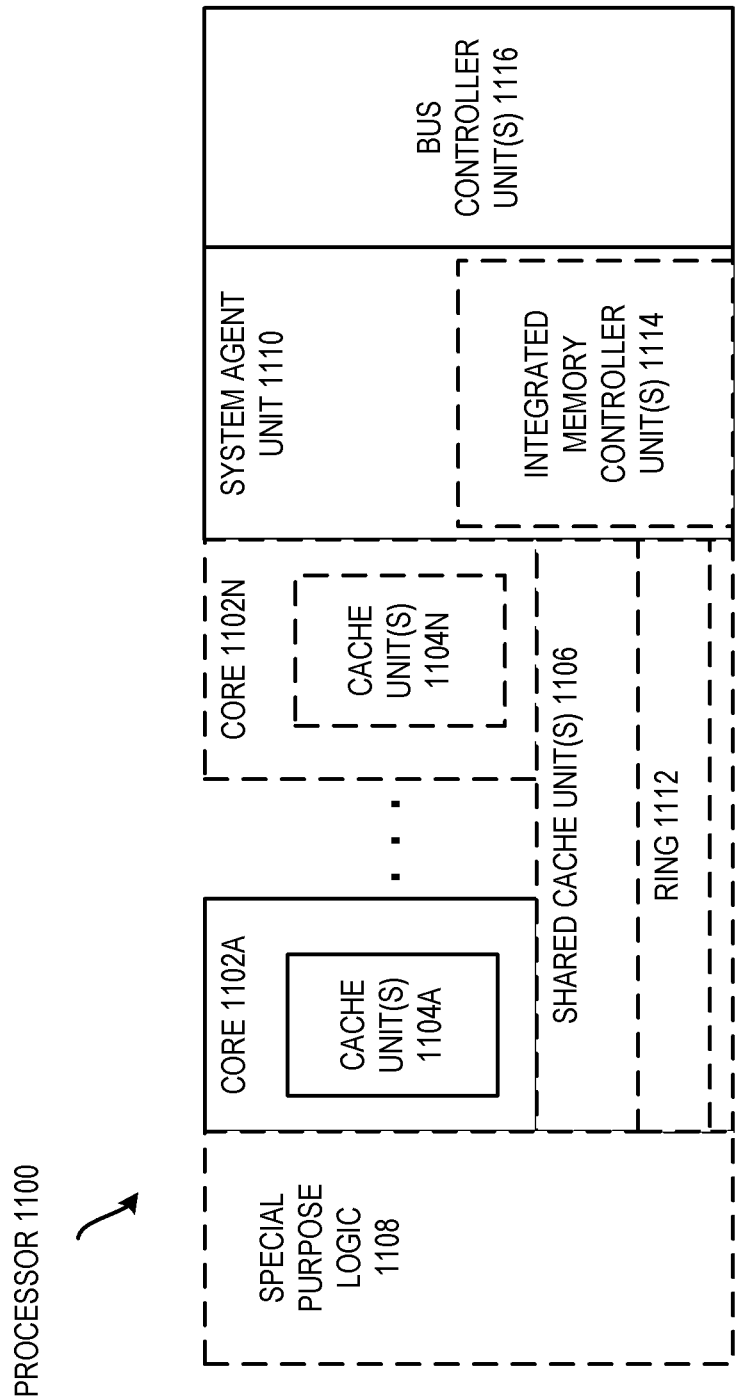
FIG. 11 is a block diagram of an embodiment of a processor that may have more than one core, may have an integrated memory controller, and may have integrated graphics.

FIG. 11 is a block diagram of a processor 1100 that may have more than one core, may have an integrated memory controller, and may have integrated graphics according to embodiments of the invention. The solid lined boxes in FIG. 11 illustrate a processor 1100 with a single core 1102A, a system agent 1110, a set of one or more bus controller units 1116, while the optional addition of the dashed lined boxes illustrates an alternative processor 1100 with multiple cores 1102A-N, a set of one or more integrated memory controller unit(s) 1114 in the system agent unit 1110, and special purpose logic 1108.

Thus, different implementations of the processor 1100 may include: 1) a CPU with the special purpose logic 1108 being integrated graphics and/or scientific (throughput) logic (which may include one or more cores), and the cores 1102A-N being one or more general purpose cores (e.g., general purpose in-order cores, general purpose out-of-order cores, a combination of the two); 2) a coprocessor with the cores 1102A-N being a large number of special purpose cores intended primarily for graphics and/or scientific (throughput); and 3) a coprocessor with the cores 1102A-N being a large number of general purpose in-order cores. Thus, the processor 1100 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1100 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1106, and external memory (not shown) coupled to the set of integrated memory controller units 1114. The set of shared cache units 1106 may include one or more mid-level caches, such as level 2 (L2), level 3 (L3), level 4 (L4), or other levels of cache, a last level cache (LLC), and/or combinations thereof. While in one embodiment a ring based interconnect unit 1112 interconnects the integrated graphics logic 1108, the set of shared cache units 1106, and the system agent unit 1110/integrated memory controller unit(s) 1114, alternative embodiments may use any number of well-known techniques for interconnecting such units. In one embodiment, coherency is maintained between one or more cache units 1106 and cores 1102-A-N.

In some embodiments, one or more of the cores 1102A-N are capable of multi-threading. The system agent 1110 includes those components coordinating and operating cores 1102A-N. The system agent unit 1110 may include for example a power control unit (PCU) and a display unit. The PCU may be or include logic and components needed for regulating the power state of the cores 1102A-N and the integrated graphics logic 1108. The display unit is for driving one or more externally connected displays.

The cores 1102A-N may be homogenous or heterogeneous in terms of architecture instruction set; that is, two or more of the cores 1102A-N may be capable of execution the same instruction set, while others may be capable of executing only a subset of that instruction set or a different instruction set.

Exemplary Computer Architectures

FIGS. 12-21 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 12:
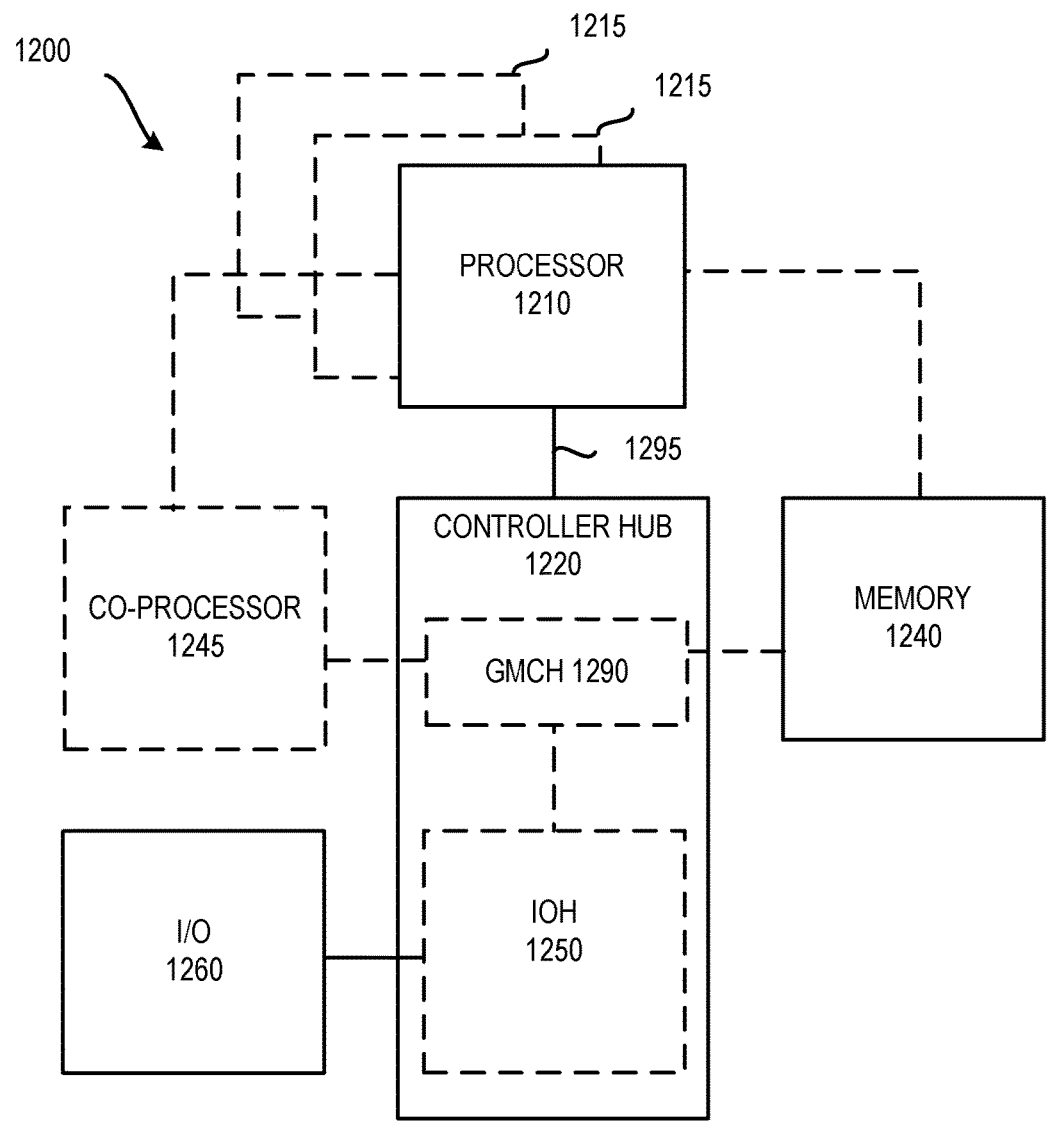
FIG. 12 is a block diagram of a first embodiment of a computer architecture.

Referring now to FIG. 12, shown is a block diagram of a system 1200 in accordance with one embodiment of the present invention. The system 1200 may include one or more processors 1210, 1215, which are coupled to a controller hub 1220. In one embodiment the controller hub 1220 includes a graphics memory controller hub (GMCH) 1290 and an Input/Output Hub (IOH) 1250 (which may be on separate chips); the GMCH 1290 includes memory and graphics controllers to which are coupled memory 1240 and a coprocessor 1245; the IOH 1250 is couples input/output (I/O) devices 1260 to the GMCH 1290. Alternatively, one or both of the memory and graphics controllers are integrated within the processor (as described herein), the memory 1240 and the coprocessor 1245 are coupled directly to the processor 1210, and the controller hub 1220 in a single chip with the IOH 1250.

The optional nature of additional processors 1215 is denoted in FIG. 12 with broken lines. Each processor 1210, 1215 may include one or more of the processing cores described herein and may be some version of the processor 1100.

The memory 1240 may be, for example, dynamic random access memory (DRAM), phase change memory (PCM), or a combination of the two. For at least one embodiment, the controller hub 1220 communicates with the processor(s) 1210, 1215 via a multi-drop bus, such as a frontside bus (FSB), point-to-point interface such as QuickPath Interconnect (QPI), or similar connection 1295.

In one embodiment, the coprocessor 1245 is a special-purpose processor, such as, for example, a high-throughput MIC processor, a network or communication processor, compression engine, graphics processor, GPGPU, embedded processor, or the like. In one embodiment, controller hub 1220 may include an integrated graphics accelerator.

There can be a variety of differences between the physical resources 1210, 1215 in terms of a spectrum of metrics of merit including architectural, microarchitectural, thermal, power consumption characteristics, and the like.

In one embodiment, the processor 1210 executes instructions that control data processing operations of a general type. Embedded within the instructions may be coprocessor instructions. The processor 1210 recognizes these coprocessor instructions as being of a type that should be executed by the attached coprocessor 1245. Accordingly, the processor 1210 issues these coprocessor instructions (or control signals representing coprocessor instructions) on a coprocessor bus or other interconnect, to coprocessor 1245. Coprocessor(s) 1245 accept and execute the received coprocessor instructions.

Figure 13:
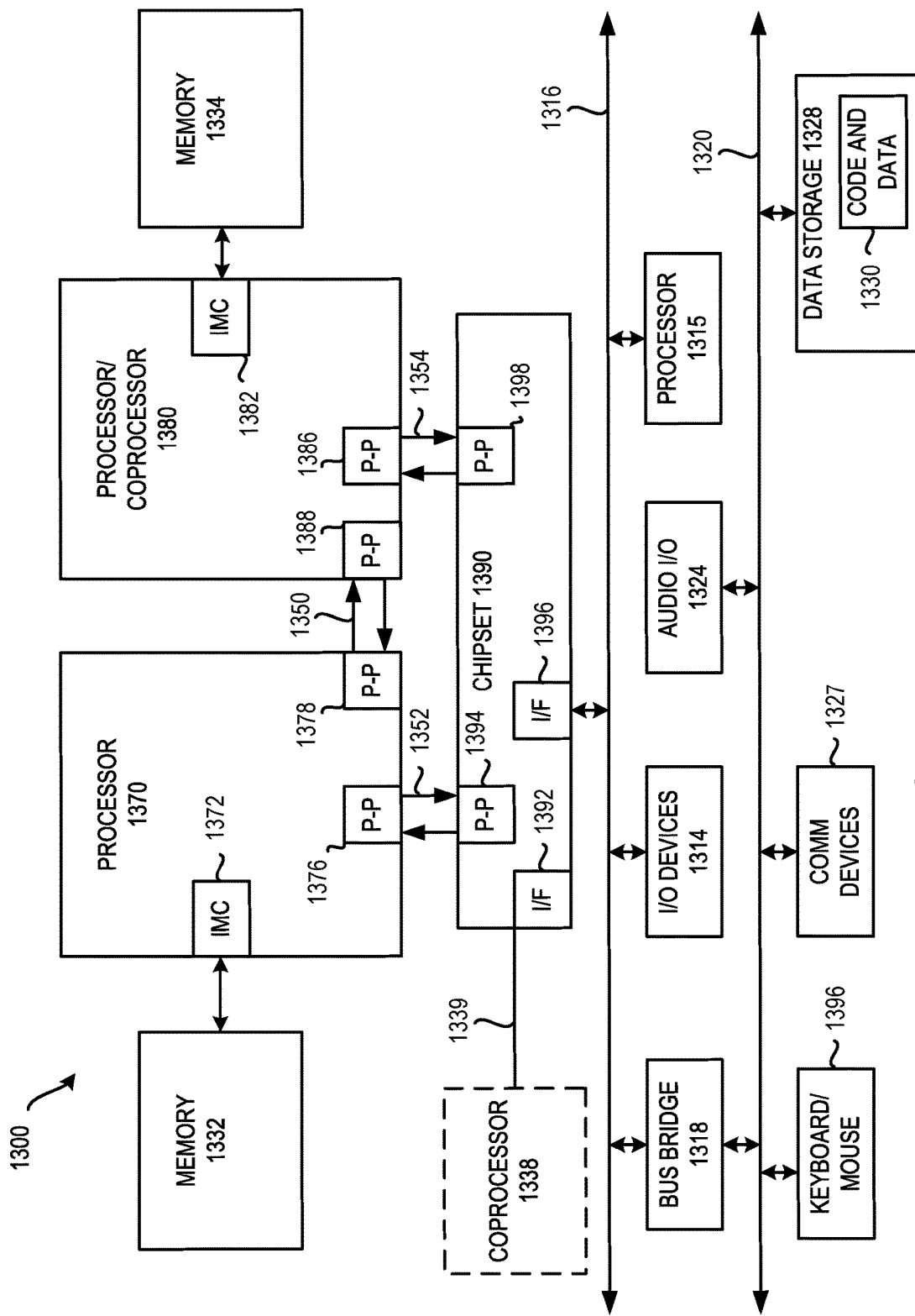
FIG. 13 is a block diagram of a second embodiment of a computer architecture.

Referring now to FIG. 13, shown is a block diagram of a first more specific exemplary system 1300 in accordance with an embodiment of the present invention. As shown in FIG. 13, multiprocessor system 1300 is a point-to-point interconnect system, and includes a first processor 1370 and a second processor 1380 coupled via a point-to-point interconnect 1350. Each of processors 1370 and 1380 may be some version of the processor 1100. In one embodiment of the invention, processors 1370 and 1380 are respectively processors 1210 and 1215, while coprocessor 1338 is coprocessor 1245. In another embodiment, processors 1370 and 1380 are respectively processor 1210 coprocessor 1245.

Processors 1370 and 1380 are shown including integrated memory controller (IMC) units 1372 and 1382, respectively. Processor 1370 also includes as part of its bus controller units point-to-point (P-P) interfaces 1376 and 1378; similarly, second processor 1380 includes P-P interfaces 1386 and 1388. Processors 1370, 1380 may exchange information via a point-to-point (P-P) interface 1350 using P-P interface circuits 1378, 1388. As shown in FIG. 13, IMCs 1372 and 1382 couple the processors to respective memories, namely a memory 1332 and a memory 1334, which may be portions of main memory locally attached to the respective processors.

Processors 1370, 1380 may each exchange information with a chipset 1390 via individual P-P interfaces 1352, 1354 using point to point interface circuits 1376, 1394, 1386, 1398. Chipset 1390 may optionally exchange information with the coprocessor 1338 via a high-performance interface 1339. In one embodiment, the coprocessor 1338 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1390 may be coupled to a first bus 1316 via an interface 1396. In one embodiment, first bus 1316 may be a Peripheral Component Interconnect (PCI) bus, or a bus such as a PCI Express bus or another third generation I/O interconnect bus, although the scope of the present invention is not so limited.

As shown in FIG. 13, various I/O devices 1314 may be coupled to first bus 1316, along with a bus bridge 1318 which couples first bus 1316 to a second bus 1320. In one embodiment, one or more additional processor(s) 1315, such as coprocessors, high-throughput MIC processors, GPGPU's, accelerators (such as, e.g., graphics accelerators or digital signal processing (DSP) units), field programmable gate arrays, or any other processor, are coupled to first bus 1316. In one embodiment, second bus 1320 may be a low pin count (LPC) bus. Various devices may be coupled to a second bus 1320 including, for example, a keyboard and/or mouse 1322, communication devices 1327 and a storage unit 1328 such as a disk drive or other mass storage device which may include instructions/code and data 1330, in one embodiment. Further, an audio I/O 1324 may be coupled to the second bus 1320. Note that other architectures are possible. For example, instead of the point-to-point architecture of FIG. 13, a system may implement a multi-drop bus or other such architecture.

Figure 14:
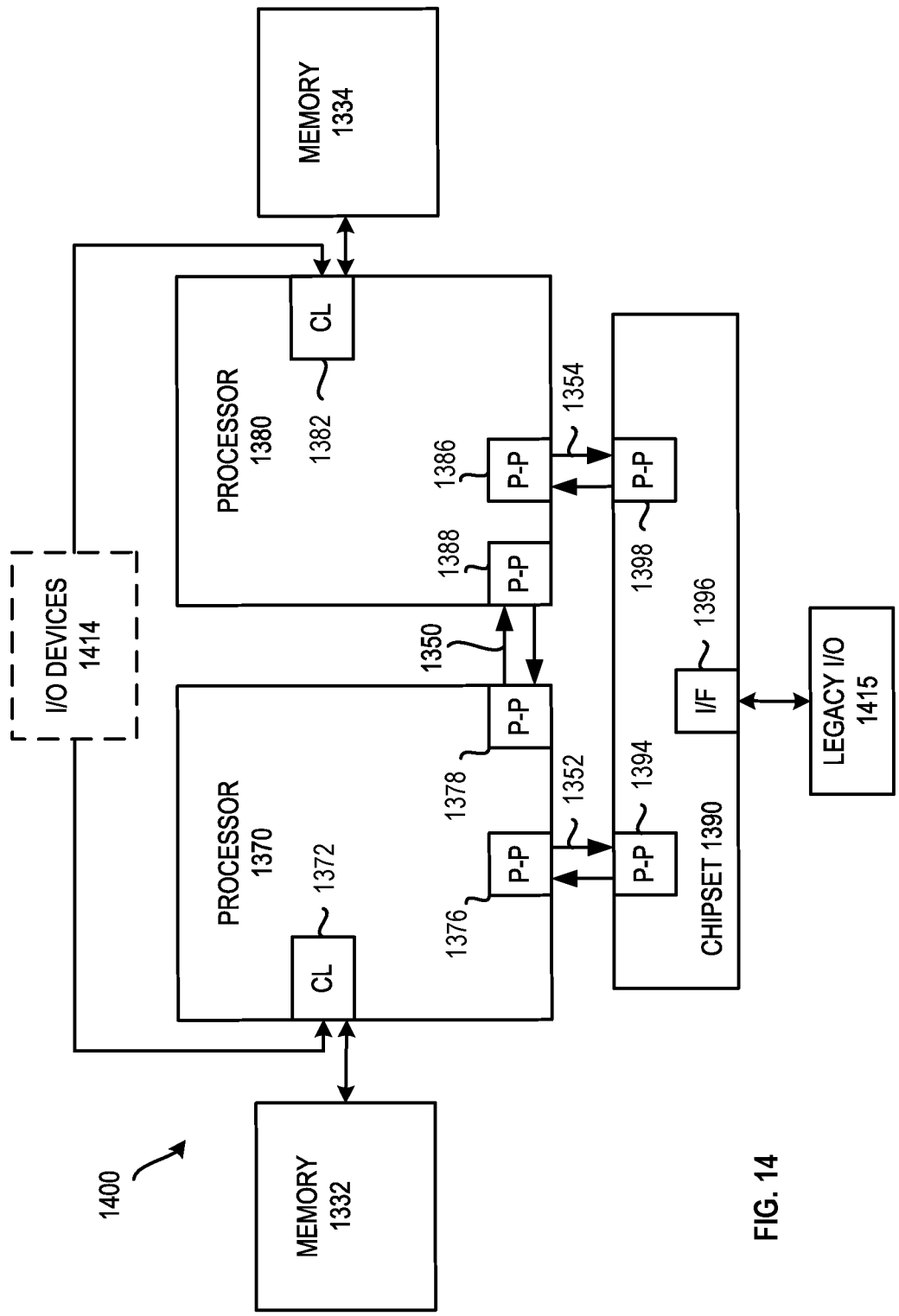
FIG. 14 is a block diagram of a third embodiment of a computer architecture.

Referring now to FIG. 14, shown is a block diagram of a second more specific exemplary system 1400 in accordance with an embodiment of the present invention. Like elements in FIGS. 13 and 14 bear like reference numerals, and certain aspects of FIG. 13 have been omitted from FIG. 14 in order to avoid obscuring other aspects of FIG. 14.

FIG. 14 illustrates that the processors 1370, 1380 may include integrated memory and I/O control logic ("CL") 1372 and 1382, respectively. Thus, the CL 1372, 1382 include integrated memory controller units and include I/O control logic. FIG. 14 illustrates that not only are the memories 1332, 1334 coupled to the CL 1372, 1382, but also that I/O devices 1414 are also coupled to the control logic 1372, 1382. Legacy I/O devices 1415 are coupled to the chipset 1390.

Figure 15:
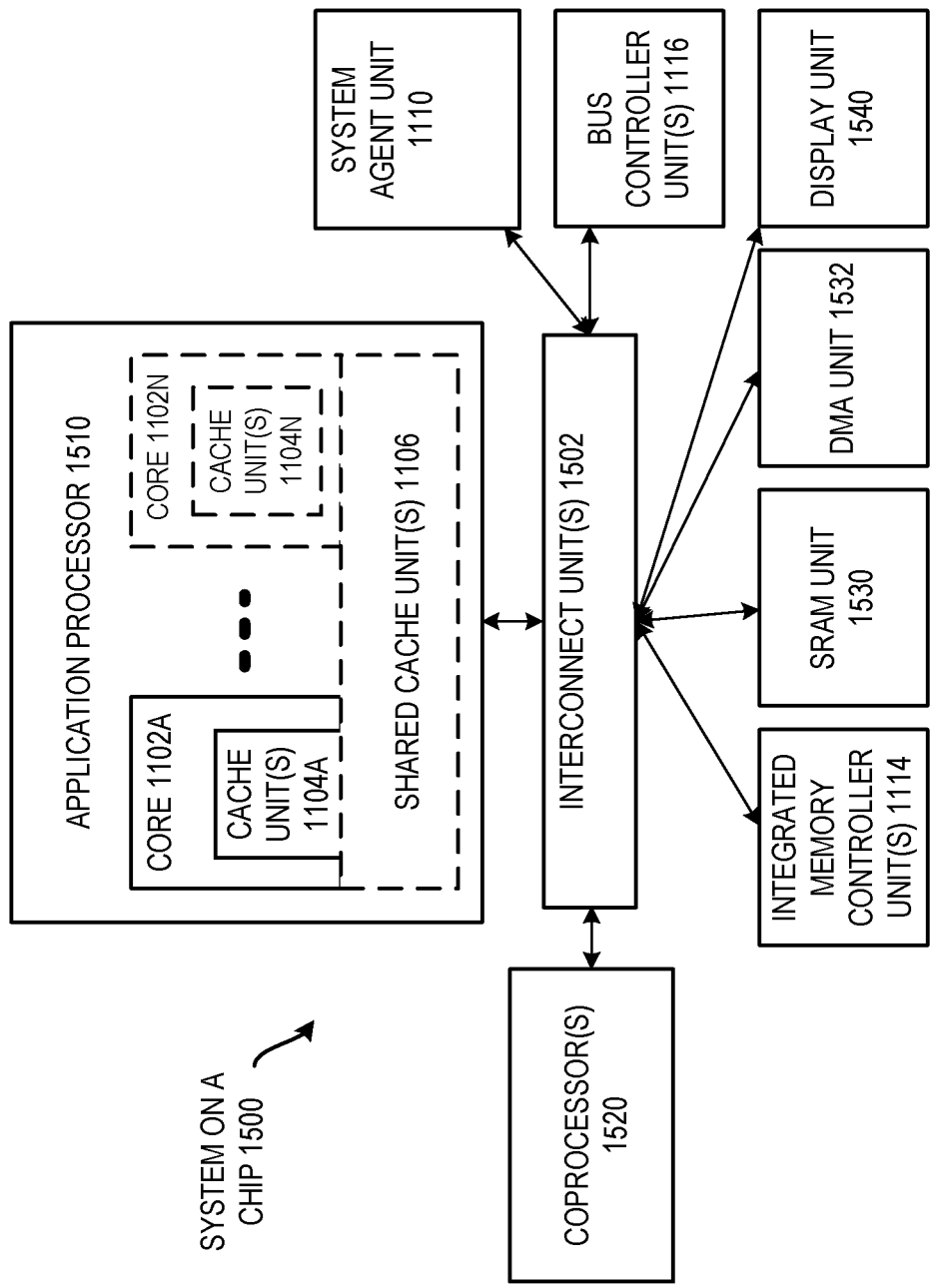
FIG. 15 is a block diagram of a fourth embodiment of a computer architecture.

Referring now to FIG. 15, shown is a block diagram of a SoC 1500 in accordance with an embodiment of the present invention. Similar elements in FIG. 11 bear like reference numerals. Also, dashed lined boxes are optional features on more advanced SoCs. In FIG. 15, an interconnect unit(s) 1502 is coupled to: an application processor 1510 which includes a set of one or more cores 142A-N and shared cache unit(s) 1106; a system agent unit 1110; a bus controller unit(s) 1116; an integrated memory controller unit(s) 1114; a set or one or more coprocessors 1520 which may include integrated graphics logic, an image processor, an audio processor, and a video processor; an static random access memory (SRAM) unit 1530; a direct memory access (DMA) unit 1532; and a display unit 1540 for coupling to one or more external displays. In one embodiment, the coprocessor(s) 1520 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1330 illustrated in FIG. 13, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 16:
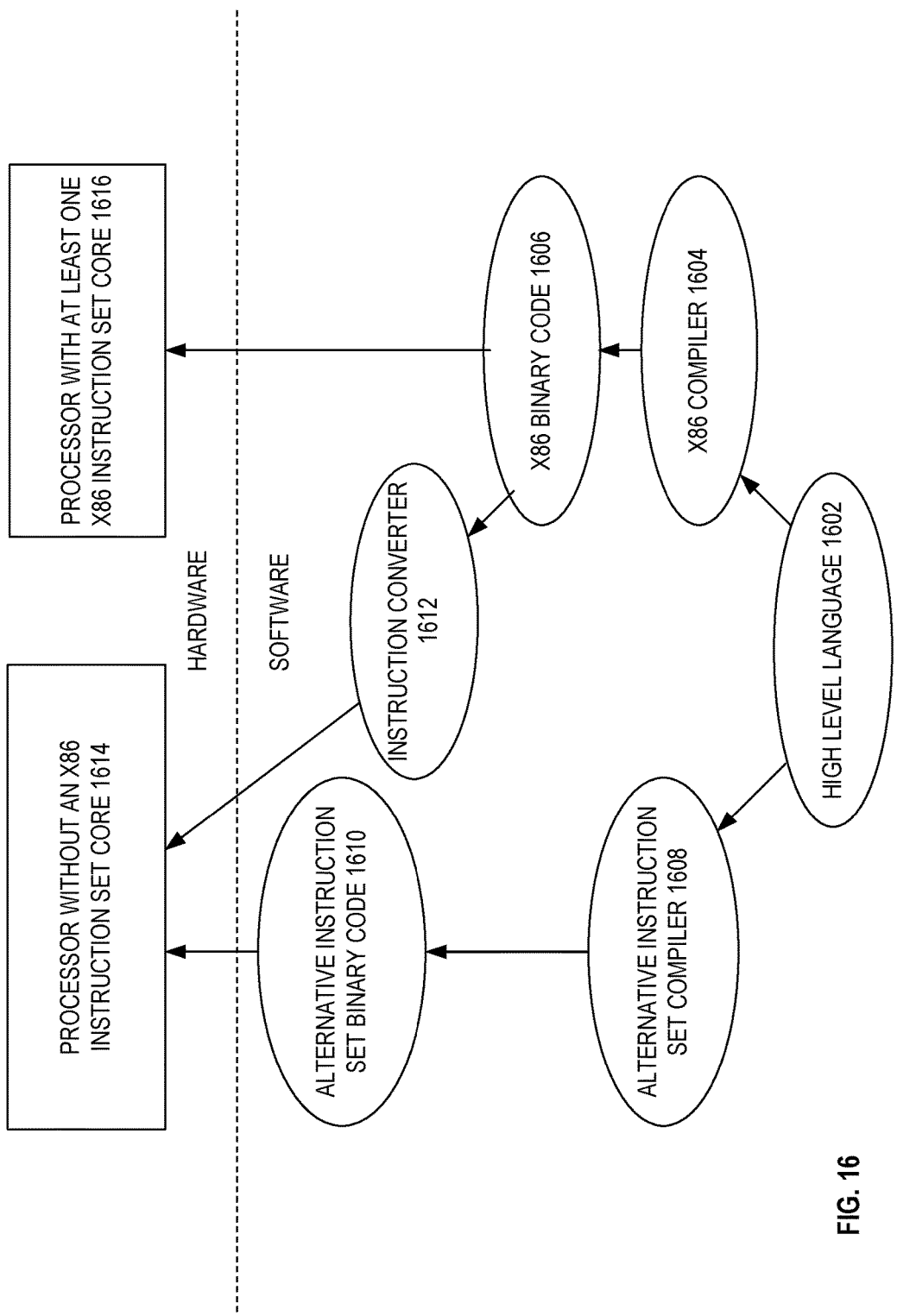
FIG. 16 is a block diagram of use of a software instruction converter to convert binary instructions in a source instruction set to binary instructions in a target instruction set, according to embodiments of the invention.

FIG. 16 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 16 shows a program in a high level language 1602 may be compiled using an x86 compiler 1604 to generate x86 binary code 1606 that may be natively executed by a processor with at least one x86 instruction set core 1616. The processor with at least one x86 instruction set core 1616 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1604 represents a compiler that is operable to generate x86 binary code 1606 (e.g., object code) that can, with or without additional linkage processing, be executed on the processor with at least one x86 instruction set core 1616. Similarly, FIG. 16 shows the program in the high level language 1602 may be compiled using an alternative instruction set compiler 1608 to generate alternative instruction set binary code 1610 that may be natively executed by a processor without at least one x86 instruction set core 1614 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1612 is used to convert the x86 binary code 1606 into code that may be natively executed by the processor without an x86 instruction set core 1614. This converted code is not likely to be the same as the alternative instruction set binary code 1610 because an instruction converter capable of this is difficult to make; however, the converted code will accomplish the general operation and be made up of instructions from the alternative instruction set. Thus, the instruction converter 1612 represents software, firmware, hardware, or a combination thereof that, through emulation, simulation or any other process, allows a processor or other electronic device that does not have an x86 instruction set processor or core to execute the x86 binary code 1606.

Components, features, and details described for any of FIGS. 1-2 and 4-8 may also optionally apply to FIG. 3. Components, features, and details described for any of the register rename units disclosed herein may optionally apply to any of the methods disclosed herein, which in embodiments may optionally be performed by and/or with such register rename units. Any of the register rename units disclosed herein in embodiments may optionally be included in any of the processors disclosed herein in any of the systems disclosed herein (e.g., any of the systems of FIGS. 12-15).

Processor components disclosed herein may be said to be operative, configured, capable, or able to perform an operation, or may be said to perform the operation. For example, a register rename unit may be to perform renaming. For clarity, it is to be understood that these expressions do not imply that the processor components are in operation or use, but rather refer to what the processor components are capable of doing or able to do when they are in operation, but in the apparatus claims these processor components are not in operation.

In the description and claims, the terms "coupled" and/or "connected," along with their derivatives, may have be used. These terms are not intended as synonyms for each other. Rather, in embodiments, "connected" may be used to indicate that two or more elements are in direct physical and/or electrical contact with each other. "Coupled" may mean that two or more elements are in direct physical and/or electrical contact with each other. However, "coupled" may also mean that two or more elements are not in direct contact with each other, but yet still co-operate or interact with each other. For example, storage structures may be coupled by intervening materials and/or structures. In the figures, arrows are used to show connections and couplings.

The term "and/or" may have been used. As used herein, the term "and/or" means one or the other or both (e.g., A and/or B means A or B or both A and B).

In the description above, specific details have been set forth in order to provide a thorough understanding of the embodiments. However, other embodiments may be practiced without some of these specific details. The scope of the invention is not to be determined by the specific examples provided above, but only by the claims below. In other instances, well-known circuits, structures, devices, and operations have been shown in block diagram form and/or without detail in order to avoid obscuring the understanding of the description. Where considered appropriate, reference numerals, or terminal portions of reference numerals, have been repeated among the figures to indicate corresponding or analogous elements, which may optionally have similar or the same characteristics, unless specified or clearly apparent otherwise.

Reference throughout this specification to "one embodiment," "an embodiment," "one or more embodiments," "some embodiments," for example, indicates that a particular feature may be included in the practice of the invention but is not necessarily required to be. Similarly, in the description various features are sometimes grouped together in a single embodiment, Figure, or description thereof to streamline the disclosure and aid in the understanding of various inventive aspects. This method of disclosure, however, is not to be interpreted as reflecting an intention that the invention requires more features than are expressly recited in each claim. Rather, as the following claims reflect, inventive aspects lie in less than all features of a single disclosed embodiment. Thus, the claims following the Detailed Description are hereby expressly incorporated into this Detailed Description, with each claim standing on its own as a separate embodiment of the invention.

EXAMPLE EMBODIMENTS

The following examples pertain to further embodiments. Specifics in the examples may be used anywhere in one or more embodiments.

Example 1 is a processor that includes a plurality of physical storage locations, and a register rename unit including a plurality of register rename storage structures. At a given time, each of a complete set or group of physical storage location identifiers is to be stored in one, but only one, of the plurality of register rename storage structures unless there is an error. Each of the complete set or group of physical storage location identifiers is to identify a different one of the plurality of physical storage locations. The register rename unit is to detect an error when a first value, which is to be equal to an operation on the complete set or group of the physical storage location identifiers with no errors, is inconsistent with a second value, which is to represent the operation on all physical storage location identifiers that are to be stored in the plurality of register rename storage structures at the given time.

Example 2 includes the processor of Example 1, in which the first value is to be known prior to a start of register renaming. Also, optionally in which the second value is to be determined at the given time which is to be after the start of register renaming.

Example 3 includes the processor of any one of Examples 1 to 2, in which the second value is to be equal to the operation on a plurality of values that are each to correspond to a different one of the plurality of register rename storage structures. Also, optionally in which each of the values is to represent the operation on all physical storage location identifiers that are to be stored in the corresponding register rename storage structures at the given time.

Example 4 includes the processor of Example 3, further including logic to generate one of the plurality of values, in which the logic does not lie directly on a write access path to the corresponding register rename storage structure.

Example 5 includes the processor of any one of Examples 1 to 4, in which the operation has a commutative property in which the first value does not depend on an order in which the operation is performed on the complete set or group of the physical storage location identifiers with no errors. Also, optionally in which the operation has an inverse operation in which the operation performed on a first value and a given physical storage location identifier to produce a second value, and then the inverse operation performed on the second value and the given physical storage location identifier reproduces the first value.

Example 6 includes the processor of any one of Examples 1 to 2, in which the first value is to be equal to an exclusive OR (XOR) of the complete set or group of the physical storage location identifiers with no errors. Also, optionally in which the second value is to represent the XOR of said all physical storage location identifiers that are to be stored in the plurality of register rename storage structures at the given time.

Example 7 includes the processor of Example 6, in which the second value is to be equal to the XOR of a plurality of running XORs that are each to correspond to a different one of the plurality of register rename storage structures. Also, optionally in which each of the running XORs is to represent the XOR of all physical storage location identifiers that are to be stored in the corresponding register rename storage structure at the given time.

Example 8 includes the processor of Example 7, further including input XOR logic to perform an XOR on each physical storage location identifier input to a corresponding register rename storage structure and a running XOR, and output XOR logic to perform an XOR on each physical storage location identifier output from the corresponding register rename storage structure and the running XOR.

Example 9 includes the processor of any one of Examples 7 to 8, in which the second value is to be equal to the XOR of a first running XOR that is to correspond to a free list storage structure, a second running XOR that is to correspond to a register map storage structure, and a third running XOR that is to correspond to a reclamation table storage structure.

Example 10 includes the processor of any one of Examples 1 to 2, in which the first value is to be equal to a sum of the complete set or group of the physical storage location identifiers with no errors. Also, optionally in which the second value is to represent the sum of said all physical storage location identifiers that are to be stored in the plurality of register rename storage structures at the given time.

Example 11 includes the processor of Example 10, in which the second value is to be equal to the sum of a plurality of running sums that are each to correspond to a different one of the register rename storage structures. Also, optionally in which each of the running sums is to represent the sum of all physical storage location identifiers that are to be stored in the corresponding register rename storage structure at the given time.

Example 12 includes the processor of any one of Examples 1 to 11, in which the register rename storage structures comprise a free list storage structure, a register rename storage structure, and a reclamation table storage structure.

Example 13 includes the processor of any one of Examples 1 to 11, in which the register rename storage structures comprise a free list storage structure, a register rename storage structure, a reclamation table storage structure, and a transactional memory storage structure.

Example 14 includes the processor of any one of Examples 1 to 11, further including at least one checkpoint table storage structure. Also, optionally further including checkpoint logic to store a value, which is to correspond to a register map storage structure, and is to represent the operation on all physical storage location identifiers that are to be stored in the register map storage structure at a second given time, in the at least one checkpoint table storage structure.

Example 15 includes the processor of Example 14, in which the checkpoint logic is to store a value, which is to correspond to a reclamation table storage structure, and is to represent the operation on all physical storage location identifiers that are to be stored in the reclamation table storage structure at the second given time, in the at least one checkpoint table storage structure.

Example 16 is a method in a processor that includes generating a second value that is to represent an operation on all physical storage location identifiers that are to be stored in a plurality of register rename storage structures of a register rename unit at a given time. At the given time, unless there is an error, each of a complete set or group of physical storage location identifiers is to be stored in one, but only one, of the plurality of register rename storage structures. The method also includes detecting an error when a first value, which is to be equal to the operation on the complete set or group of the physical storage location identifiers with no errors, is inconsistent with the second value.

Example 17 includes the method of Example 16, further including generating the first value prior to a start of register renaming.

Example 18 includes the method of Example 17, in which said generating includes generating the second value after the start of register renaming.

Example 19 includes the method of any one of Examples 16 to 18, in which said generating includes performing XORs on physical storage location identifiers.

Example 20 includes the method of any one of Examples 16 to 18, in which said generating includes adding and subtracting physical storage location identifiers.

Example 21 includes the method of any one of Examples 16 to 20, in which said generating includes performing the operation on a plurality of values that each correspond to a different one of the register rename storage structures.

Example 22 includes the method of any one of Examples 16 to 18, in which said generating includes performing an XOR on a plurality of running XOR values that each correspond to a different one of the register rename storage structures.

Example 23 includes the method of any one of Examples 16 to 22, further including checkpointing a value, which corresponds to a register map storage structure, and represents the operation on all physical storage location identifiers stored in the register map storage structure at a second given time.

Example 24 is a computer system that includes an interconnect, a dynamic random access memory coupled with the interconnect, and a processor coupled with the interconnect. The processor including a plurality of physical storage locations, and a register rename unit including a plurality of register rename storage structures. At a given time, each of a complete set or group of physical storage location identifiers is to be stored in one, but only one, of the plurality of register rename storage structures unless there is an error. Each of the complete set or group of physical storage location identifiers to identify a different one of the plurality of physical storage locations. The register rename unit is to detect an error when a first value, which is to be equal to an operation on the complete set or group of the physical storage location identifiers with no errors, is inconsistent with a second value, which is to represent the operation on all physical storage location identifiers that are to be stored in the plurality of register rename storage structures at the given time.

Example 25 includes the computer system of Example 24, in which the first value is to be known prior to a start of register renaming, and in which the second value is to be determined at the given time which is to be after the start of register renaming.

Example 26 includes the processor of any one of Examples 1 to 15, further including an optional branch prediction unit to predict branches, and an optional instruction prefetch unit, coupled with the branch prediction unit, the instruction prefetch unit to prefetch instructions. The processor may also optionally include an optional level 1 (L1) instruction cache coupled with the instruction prefetch unit, the L1 instruction cache to store instructions, an optional L1 data cache to store data, and an optional level 2 (L2) cache to store data and instructions. The processor may also optionally include an instruction fetch unit coupled with the decode unit, the L1 instruction cache, and the L2 cache, to fetch instructions, in some cases from one of the L1 instruction cache and the L2 cache, and to provide the instructions to the decode unit. The processor may also optionally include an optional scheduler to schedule one or more operations that have been decoded from the instructions for execution, and an optional commit unit to commit execution results of the instructions.

Example 27 includes a system-on-chip that includes at least one interconnect, the processor of any one of Examples 1 to 15 coupled with the at least one interconnect, an optional graphics processing unit (GPU) coupled with the at least one interconnect, an optional digital signal processor (DSP) coupled with the at least one interconnect, an optional display controller coupled with the at least one interconnect, an optional memory controller coupled with the at least one interconnect, an optional wireless modem coupled with the at least one interconnect, an optional image signal processor coupled with the at least one interconnect, an optional Universal Serial Bus (USB) 3.0 compatible controller coupled with the at least one interconnect, an optional Bluetooth 4.1 compatible controller coupled with the at least one interconnect, and an optional wireless transceiver controller coupled with the at least one interconnect.

Example 28 is a processor or other apparatus operative to perform the method of any one of Examples 16 to 23.

Example 29 is a processor or other apparatus that includes means for performing the method of any one of Examples 16 to 23.

Example 30 is a processor or other apparatus substantially as described herein.

Example 31 is a processor or other apparatus that is operative to perform any method substantially as described herein.

Example 32 is a processor or other apparatus that includes means for generating a second value that is to represent an operation on all physical storage location identifiers that are to be stored in a plurality of register rename storage structures of a register rename unit at a given time. At the given time, unless there is an error, each of a complete set or group of physical storage location identifiers is to be stored in one, but only one, of the plurality of register rename storage structures. The apparatus also includes means for detecting an error when a first value, which is to be equal to the operation on the complete set or group of the physical storage location identifiers with no errors, is inconsistent with the second value.

What is claimed is:

1. A processor comprising:
a plurality of physical storage locations; and
a register rename unit including a plurality of register rename storage structures, wherein, at a given time, each of a complete group of physical storage location identifiers is to be stored in one, but only one, of the plurality of register rename storage structures unless there is an error, each of the complete group of physical storage location identifiers to identify a different one of the plurality of physical storage locations, the register rename unit to detect an error when a first value, which is to be equal to an operation on the complete group of the physical storage location identifiers with no errors, is inconsistent with a second value, which is to represent the operation on all physical storage location identifiers that are to be stored in the plurality of register rename storage structures at the given time.

2. The processor of claim 1, wherein the first value is to be known prior to a start of register renaming, and wherein the second value is to be determined at the given time which is to be after the start of register renaming.

3. The processor of claim 1, wherein the second value is to be equal to the operation on a plurality of values that are each to correspond to a different one of the plurality of register rename storage structures, and wherein each of the values is to represent the operation on all physical storage location identifiers that are to be stored in the corresponding register rename storage structures at the given time.

4. The processor of claim 3, further comprising logic to generate one of the plurality of values, wherein the logic does not lie directly on a write access path to the corresponding register rename storage structure.

5. The processor of claim 1, wherein the operation has a commutative property in which the first value does not depend on an order in which the operation is performed on the complete group of the physical storage location identifiers with no errors, and wherein the operation has an inverse operation in which the operation performed on a first value and a given physical storage location identifier to produce a second value, and then the inverse operation performed on the second value and the given physical storage location identifier reproduces the first value.

6. The processor of claim 1, wherein the first value is to be equal to an exclusive OR (XOR) of the complete group of the physical storage location identifiers with no errors, and wherein the second value is to represent the XOR of said all physical storage location identifiers that are to be stored in the plurality of register rename storage structures at the given time.

7. The processor of claim 6, wherein the second value is to be equal to the XOR of a plurality of running XORs that are each to correspond to a different one of the plurality of register rename storage structures, and wherein each of the running XORs is to represent the XOR of all physical storage location identifiers that are to be stored in the corresponding register rename storage structure at the given time.

8. The processor of claim 7, further comprising:
input XOR logic to perform an XOR on each physical storage location identifier input to a corresponding register rename storage structure and a running XOR; and
output XOR logic to perform an XOR on each physical storage location identifier output from the corresponding register rename storage structure and the running XOR.

9. The processor of claim 7, wherein the second value is to be equal to the XOR of a first running XOR that is to correspond to a free list storage structure, a second running XOR that is to correspond to a register map storage structure, and a third running XOR that is to correspond to a reclamation table storage structure.

10. The processor of claim 1, wherein the first value is to be equal to a sum of the complete group of the physical storage location identifiers with no errors, and wherein the second value is to represent the sum of said all physical storage location identifiers that are to be stored in the plurality of register rename storage structures at the given time.

11. The processor of claim 10, wherein the second value is to be equal to the sum of a plurality of running sums that are each to correspond to a different one of the register rename storage structures, and wherein each of the running sums is to represent the sum of all physical storage location identifiers that are to be stored in the corresponding register rename storage structure at the given time.

12. The processor of claim 1, wherein the register rename storage structures comprise a free list storage structure, a register rename storage structure, and a reclamation table storage structure.

13. The processor of claim 1, wherein the register rename storage structures comprise a free list storage structure, a register rename storage structure, a reclamation table storage structure, and a transactional memory storage structure.

14. The processor of claim 1, further comprising:
at least one checkpoint table storage structure; and
checkpoint logic to store a value, which is to correspond to a register map storage structure, and is to represent the operation on all physical storage location identifiers that are to be stored in the register map storage structure at a second given time, in the at least one checkpoint table storage structure.

15. The processor of claim 14, wherein the checkpoint logic is to store a value, which is to correspond to a reclamation table storage structure, and is to represent the operation on all physical storage location identifiers that are to be stored in the reclamation table storage structure at the second given time, in the at least one checkpoint table storage structure.

16. A method in a processor comprising:
generating a second value that is to represent an operation on all physical storage location identifiers that are to be stored in a plurality of register rename storage structures of a register rename unit at a given time, wherein, at the given time, unless there is an error, each of a complete group of physical storage location identifiers is to be stored in one, but only one, of the plurality of register rename storage structures; and
detecting an error when a first value, which is to be equal to the operation on the complete group of the physical storage location identifiers with no errors, is inconsistent with the second value.

17. The method of claim 16, further comprising generating the first value prior to a start of register renaming.

18. The method of claim 17, wherein said generating comprises generating the second value after the start of register renaming.

19. The method of claim 16, wherein said generating comprises performing XORs on physical storage location identifiers.

20. The method of claim 16, wherein said generating comprises adding and subtracting physical storage location identifiers.

21. The method of claim 16, wherein said generating comprises performing the operation on a plurality of values that each correspond to a different one of the register rename storage structures.

22. The method of claim 16, wherein said generating comprises performing an XOR on a plurality of running XOR values that each correspond to a different one of the register rename storage structures.

23. The method of claim 16, further comprising checkpointing a value, which corresponds to a register map storage structure, and represents the operation on all physical storage location identifiers stored in the register map storage structure at a second given time.

24. A computer system comprising:
an interconnect;
a dynamic random access memory coupled with the interconnect; and
a processor coupled with the interconnect, the processor comprising:
a plurality of physical storage locations; and
a register rename unit including a plurality of register rename storage structures, wherein, at a given time, each of a complete group of physical storage location identifiers is to be stored in one, but only one, of the plurality of register rename storage structures unless there is an error, each of the complete group of physical storage location identifiers to identify a different one of the plurality of physical storage locations, the register rename unit to detect an error when a first value, which is to be equal to an operation on the complete group of the physical storage location identifiers with no errors, is inconsistent with a second value, which is to represent the operation on all physical storage location identifiers that are to be stored in the plurality of register rename storage structures at the given time.

25. The computer system of claim 24, wherein the first value is to be known prior to a start of register renaming, and wherein the second value is to be determined at the given time which is to be after the start of register renaming.

* * * * *